US011284308B2

(12) United States Patent
Sadek et al.

(10) Patent No.: US 11,284,308 B2
(45) Date of Patent: *Mar. 22, 2022

(54) NR-SS UNIFIED OPERATION MODE IN COORDINATED AND UNCOORDINATED BANDS

(71) Applicant: QUALCOMM Incorporated, San Diego, CA (US)

(72) Inventors: Ahmed Kamel Sadek, San Diego, CA (US); Yisheng Xue, San Diego, CA (US); Siddhartha Mallik, San Diego, CA (US); Tamer Kadous, San Diego, CA (US); Xiaoxia Zhang, San Diego, CA (US); Taesang Yoo, San Diego, CA (US); Michael Mingxi Fan, San Diego, CA (US); Aleksandar Damnjanovic, Del Mar, CA (US); Yongbin Wei, La Jolla, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/584,366

(22) Filed: Sep. 26, 2019

(65) Prior Publication Data

US 2020/0022029 A1 Jan. 16, 2020

Related U.S. Application Data

(63) Continuation of application No. 15/985,048, filed on May 21, 2018, now Pat. No. 10,455,457.
(Continued)

(51) Int. Cl.
*H04W 28/26* (2009.01)
*H04W 52/24* (2009.01)
(Continued)

(52) U.S. Cl.
CPC ............ *H04W 28/26* (2013.01); *H04B 7/063* (2013.01); *H04B 7/0626* (2013.01); *H04L 5/006* (2013.01);
(Continued)

(58) Field of Classification Search
CPC ................. H04W 28/26; H04W 16/14; H04W 52/241; H04B 7/0626; H04B 7/063; H04L 5/0035; H04L 5/0048; H04L 5/0051; H04L 5/006
(Continued)

(56) References Cited

U.S. PATENT DOCUMENTS

| 9,420,472 B2 | 8/2016 | Chen et al. |
| 10,034,313 B2 | 7/2018 | Zhang et al. |

(Continued)

FOREIGN PATENT DOCUMENTS

| CN | 106165522 A | 11/2016 |
| JP | 2020517160 A | 6/2020 |

(Continued)

OTHER PUBLICATIONS

International Search Report and Written Opinion—PCT/US2018/033857—ISA/EPO—dated Aug. 27, 2018.
(Continued)

*Primary Examiner* — Faisal Choudhury
(74) *Attorney, Agent, or Firm* — Liem T. Do

(57) ABSTRACT

A medium reservation framework is disclosed for coexistence of coordinated and uncoordinated wireless networks in licensed spectrum and shared spectrum. The proposed medium reservation framework organically takes into account operating regimes with different numbers of Tx/Rx antennas per node, provides flexibility in trading off medium contention aggressiveness and power saving, leverages the inherent synchronization nature of NR, and covers both
(Continued)

coordinated and uncoordinated operation scenarios. Various aspects of the medium reservation framework may be centered on one or more combinations of some basic building blocks, such as an operation grid, synchronization signals, and reservation messages, such as a reservation request signal (RRQ) and one or more a reservation response signals (RRS).

38 Claims, 11 Drawing Sheets

Related U.S. Application Data

(60) Provisional application No. 62/510,534, filed on May 24, 2017.

(51) Int. Cl.
*H04L 5/00* (2006.01)
*H04W 16/14* (2009.01)
*H04B 7/06* (2006.01)
H04L 27/00 (2006.01)
H04L 5/14 (2006.01)
H04B 17/336 (2015.01)
H04W 74/08 (2009.01)
H04W 84/04 (2009.01)

(52) U.S. Cl.
CPC .......... *H04L 5/0035* (2013.01); *H04L 5/0048* (2013.01); *H04L 5/0051* (2013.01); *H04W 16/14* (2013.01); *H04W 52/241* (2013.01); H04B 17/336 (2015.01); H04L 5/14 (2013.01); H04L 27/0014 (2013.01); H04W 74/0833 (2013.01); H04W 84/045 (2013.01)

(58) Field of Classification Search
USPC ........................................................ 370/329
See application file for complete search history.

(56) References Cited

U.S. PATENT DOCUMENTS

| | | | |
|---|---|---|---|
| 10,075,969 B2* | 9/2018 | Bertrand | ........... H04W 72/1231 |
| 10,098,140 B2 | 10/2018 | Mallik et al. | |
| 10,880,761 B2 | 12/2020 | Nagaraja et al. | |
| 2012/0002710 A1* | 1/2012 | Park | .................. H04L 25/03343 375/227 |
| 2014/0112168 A1 | 4/2014 | Chen et al. | |
| 2014/0234854 A1 | 8/2014 | Blume et al. | |
| 2015/0250002 A1 | 9/2015 | Sun et al. | |
| 2015/0295847 A1 | 10/2015 | Shen et al. | |
| 2016/0021577 A1* | 1/2016 | Du | ......................... H04W 28/26 370/336 |
| 2016/0134397 A1 | 5/2016 | Kobayashi | |
| 2016/0212625 A1 | 7/2016 | Damnjanovic | |
| 2016/0345206 A1 | 11/2016 | Yerramalli | |
| 2018/0227851 A1 | 8/2018 | Kubota et al. | |
| 2018/0234854 A1 | 8/2018 | Zhang et al. | |
| 2018/0302796 A1 | 10/2018 | Zhang et al. | |
| 2018/0343588 A1 | 11/2018 | Sadek et al. | |

FOREIGN PATENT DOCUMENTS

| | | |
|---|---|---|
| WO | WO-2009143382 A2 | 11/2009 |
| WO | WO-2015047849 A2 | 4/2015 |
| WO | WO-2015152996 A1 | 10/2015 |
| WO | WO-2016048798 A1 | 3/2016 |
| WO | WO-2017131860 A1 | 8/2017 |
| WO | WO-2019051487 A1 | 3/2019 |

OTHER PUBLICATIONS

Ericsson: "On CSI Reporting forsTTI", 3GPP TSG-RAN WG1 Meeting #89, R1-1708845, Hangzhou, P.R. China, May 15-19, 2017, pp. 1-4.
Mediatek Inc: "Interference Management in NR", 3GPP TSG RAN WG1 Meeting #88bis, 3GPP Draft; R1-1704450 Interference Management IN NR V1 Final, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr 7, 2017, Apr. 2, 2017, 26 Pages, XP051242595, Retrieved from the Internet: URL: http://www.3gpp.org/ftp/Meetings_3GPP_SYNC/RAN1/Docs/ [retrieved on Apr. 2, 2017].
Mediatek Inc: "Interference Management Techniques for Dynamic TDD", 3GPP TSG RAN WG1 Meeting NR Ad Hoc, R1-1700156, Spokane, USA, Jan. 16-20, 2017, pp. 1-20.
Taiwan Search Report—TW107117499—TIPO—dated Jun. 10, 2020 (174007TW).

* cited by examiner

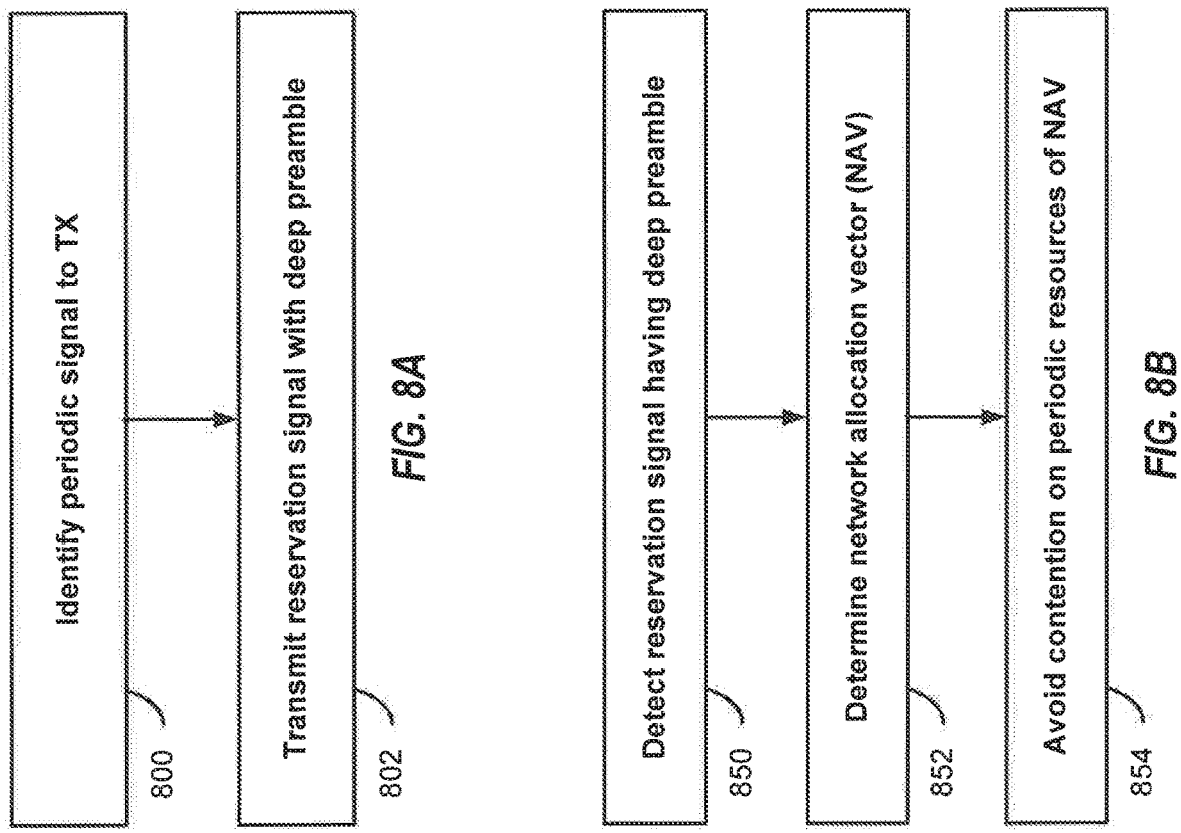
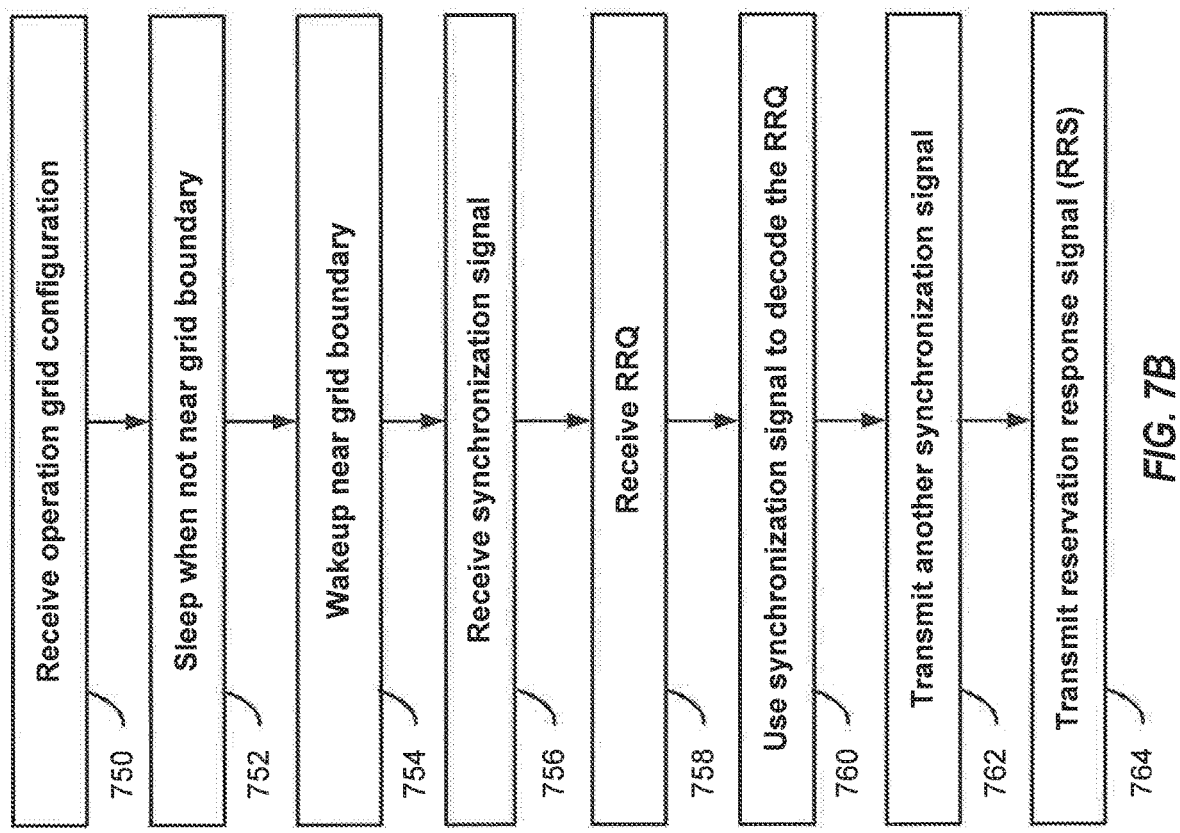

900 Schedule gNBs of CoMP cluster for uncoordinated mode of operation, such that each gNB maintains its own NAV and contends separately for wireless transmission resources → 902 Preferentially schedule gNBs having expired NAVs

*FIG. 9A*

920 Schedule gNBs of CoMP cluster for uncoordinated mode of operation, such that each gNB maintains its own NAV and contends separately for wireless transmission resources → 922 Preferentially schedule gNB having largest NAV

*FIG. 9B*

950 Schedule gNBs of CoMP cluster for uncoordinated mode of operation, such that exactly one gNB of the CoMP cluster, designated as a cluster head, is running full contention for wireless transmission resources → 952 Dynamically change which gNB of the CoMP cluster is designated as the cluster head

*FIG. 9C*

970 Receive, by other gNBs of the CoMP cluster, RRQ transmitted by cluster head when it clears resources → 972 Determine whether transmission will avoid exceeding a predetermined interference level threshold → 974 Send RRS only if the threshold will not be exceeded

*FIG. 9D*

NR-SS UNIFIED OPERATION MODE IN COORDINATED AND UNCOORDINATED BANDS

CROSS-REFERENCE TO RELATED APPLICATIONS

This application is a continuation of U.S. patent application Ser. No. 15/985,048, entitled, "NR-SS UNIFIED OPERATION MODE IN COORDINATED AND UNCOORDINATED BANDS," filed on May 21, 2018, and claims the benefit of U.S. Provisional Patent Application No. 62/510,534, entitled, "NR-SS UNIFIED OPERATION MODE IN COORDINATED AND UNCOORDINATED BANDS," filed on May 24, 2017, which is expressly incorporated by reference herein in its entirety.

BACKGROUND

Field

Aspects of the present disclosure relate generally to wireless communication systems, and more particularly, to a medium reservation framework for coexistence of coordinated and uncoordinated wireless networks in licensed spectrum and shared spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a reservation request (RRQ) transmitted by a next generation Node B (gNB). The method additionally includes transmitting, by the UE in response to the RRQ, a reservation response signal (RRS). The RRS carries a precoded sounding reference signal (SRS) modulated by an indication of interference estimated by UE.

In another aspect, a wireless communication apparatus has means for receiving, at a user equipment (UE), a reservation request (RRQ) transmitted by a next generation Node B (gNB). The apparatus additionally has means for transmitting, by the UE in response to the RRQ, a reservation response signal (RRS). The RRS carries a precoded sounding reference signal (SRS) modulated by an indication of interference estimated by UE.

In another aspect, a wireless communication apparatus has at least one computer processor and a memory coupled to the at least one computer processor. The at least one computer processor is configured to receive, at a user equipment (UE), a reservation request (RRQ) transmitted by a next generation Node B (gNB). The at least one computer processor is additionally configured to transmit, by the UE in response to the RRQ, a reservation response signal (RRS). The RRS carries a precoded sounding reference signal (SRS) modulated by an indication of interference estimated by UE.

In another aspect, a computer program product includes a computer-readable medium having instructions recorded thereon that, when enacted by one or more computer processors, cause the one or more computer processors to perform procedures. The procedures include receiving, at a user equipment (UE), a reservation request (RRQ) transmitted by a next generation Node B (gNB). The procedures additionally include transmitting, by the UE in response to the RRQ, a reservation response signal (RRS). The RRS carries a precoded sounding reference signal (SRS) modulated by an indication of interference estimated by the UE.

In another aspect, a method of wireless communication includes transmitting, by a next generation Node B (gNB) to a user equipment (UE), a reservation request (RRQ). The method additionally includes detecting, by the gNB, a reservation response signal (RRS) transmitted by the UE in response to the RRQ. The RRS includes a precoded sounding reference signal (SRS) modulated by an indication of interference estimated by UE. The method also includes employing the indication of interference to select, for wireless communication between the UE and the gNB, at least one of: a precoder; a rank; or a modulation and coding scheme (MCS).

In another aspect, a wireless communication apparatus has means for transmitting, by a next generation Node B (gNB) to a user equipment (UE), a reservation request (RRQ). The apparatus additionally has means for detecting, by the gNB, a reservation response signal (RRS) transmitted by the UE in response to the RRQ. The RRS includes a precoded sounding reference signal (SRS) modulated by an indication of interference estimated by UE. The apparatus also has means for employing the indication of interference to select, for wireless communication between the UE and the gNB, at least one of: a precoder; a rank; or a modulation and coding scheme (MCS).

In another aspect, a wireless communication apparatus has at least one computer processor and at least one memory coupled to the at least one computer processor. The at least one computer processor is configured to transmit, by a next generation Node B (gNB) to a user equipment (UE), a reservation request (RRQ). The at least one computer processor is additionally configured to detect, by the gNB, a reservation response signal (RRS) transmitted by the UE in response to the RRQ. The RRS includes a precoded sounding reference signal (SRS) modulated by an indication of interference estimated by UE. The at least one computer processor is also configured to employ the indication of interference to select, for wireless communication between the UE and the gNB, at least one of: a precoder; a rank; or a modulation and coding scheme (MCS).

In another aspect, a computer program product includes a computer-readable medium having instructions recorded thereon that, when enacted by one or more computer processors, cause the one or more computer processors to perform procedures. The procedures include transmitting, by a next generation Node B (gNB) to a user equipment (UE), a reservation request (RRQ). The procedures additionally include detecting, by the gNB, a reservation response signal (RRS) transmitted by the UE in response to the RRQ. The RRS includes a precoded sounding reference signal (SRS) modulated by an indication of interference estimated by UE. The procedures also include employing the indication of interference to select, for wireless communication between the UE and the gNB, at least one of: a precoder; a rank; or a modulation and coding scheme (MCS).

In another aspect, a method of wireless communication includes transmitting, by a next generation Node B (gNB) to a user equipment (UE), a reservation request (RRQ). The method additionally includes detecting, by the gNB, a reservation response signal (RRS) transmitted by the UE in response to the RRQ. The RRS includes a preceoded sounding reference signal (SRS) modulated by an indication of interference estimated by the UE. The indication of interference communicates a rise in interference level, to wireless communications between the UE and a serving gNB thereof, that is attributable to one or more wireless transmissions by the gNB. The method also includes transmitting, by the gNB in response to the RRS, the wireless transmissions in a manner that avoids causing interference to the wireless communications that exceeds a predetermined interference level threshold.

In another aspect, a wireless communication apparatus has means for transmitting, by a next generation Node B (gNB) to a user equipment (UE), a reservation request (RRQ). The apparatus additionally has means for detecting, by the gNB, a reservation response signal (RRS) transmitted by the UE in response to the RRQ. The RRS includes a precoded sounding reference signal (SRS) modulated by an indication of interference estimated by the UE. The indication of interference communicates a rise in interference level, to wireless communications between the UE and a serving gNB thereof, that is attributable to one or more wireless transmissions by the gNB. The apparatus also has means for transmitting, by the gNB in response to the RRS, the wireless transmissions in a manner that avoids causing interference to the wireless communications that exceeds a predetermined interference level threshold.

In another aspect, a wireless communication apparatus includes at least one computer processor and at least one memory coupled to the at least one computer processor. The at least one computer processor is configured to transmit, by a next generation Node B (gNB) to a user equipment (UE), a reservation request (RRQ). The at least one computer processor is also configured to detect, by the gNB, a reservation response signal (RRS) transmitted by the UE in response to the RRQ. The RRS includes a precoded sounding reference signal (SRS) modulated by an indication of interference estimated by the UE. The indication of interference communicates a rise in interference level, to wireless communications between the UE and a serving gNB thereof, that is attributable to one or more wireless transmissions by the gNB. The at least one computer processor is also configured to transmit, by the gNB in response to the RRS, the wireless transmissions in a manner that avoids causing interference to the wireless communications that exceeds a predetermined interference level threshold.

In another aspect, a computer program product includes a computer-readable medium having instructions recorded thereon that, when enacted by one or more computer processors, cause the one or more computer processors to perform procedures. The procedures include transmitting, by a next generation Node B (gNB) to a user equipment (UE), a reservation request (RRQ). The procedures additionally include detecting, by the gNB, a reservation response signal (RRS) transmitted by the UE in response to the RRQ. The RRS includes a precoded sounding reference signal (SRS) modulated by an indication of interference estimated by the UE. The indication of interference communicates a rise in interference level, to wireless communications between the UE and a serving gNB thereof, that is attributable to one or more wireless transmissions by the gNB. The procedures also include transmitting, by the gNB in response to the RRS, the wireless transmissions in a manner that avoids causing interference to the wireless communications that exceeds a predetermined interference level threshold.

In another aspect, a method of wireless communication includes transmitting, by a gNB, a synchronization signal. The method additionally includes transmitting, by the gNB after transmission of the synchronization signal, a reservation request (RRQ). The RRQ includes a network allocation vector (NAV) and a control reference signal (RS) for decoding the NAV. The synchronization signal enables one or more other nodes not coordinated with the gNB to decode the RRQ.

In another aspect, a wireless communication apparatus has means for transmitting, by a gNB, a synchronization signal. The apparatus additionally has means for transmitting, by the gNB after transmission of the synchronization signal, a reservation request (RRQ). The RRQ includes a network allocation vector (NAV) and a control reference signal (RS) for decoding the NAV. The synchronization signal enables one or more other nodes not coordinated with the gNB to decode the RRQ.

In another aspect, a wireless communication apparatus includes at least one computer processor and at least one memory coupled to the at least one computer processor. The at least one computer processor is configured to transmit, by a gNB, a synchronization signal. The at least one computer processor is additionally configured to transmit, by the gNB after transmission of the synchronization signal, a reservation request (RRQ). The RRQ includes a network allocation vector (NAV) and a control reference signal (RS) for decoding the NAV. The synchronization signal enables one or more other nodes not coordinated with the gNB to decode the RRQ.

In another aspect, a computer program product includes a computer-readable medium having instructions recorded thereon that, when enacted by one or more computer processors, cause the one or more computer processors to perform procedures. The procedures include transmitting, by a gNB, a synchronization signal. The procedures additionally include transmitting, by the gNB after transmission of the synchronization signal, a reservation request (RRQ). The RRQ includes a network allocation vector (NAV) and a control reference signal (RS) for decoding the NAV. The synchronization signal enables one or more other nodes not coordinated with the gNB to decode the RRQ.

In aonther aspect, a method of wireless communication includes detecting, by a user equipment (UE), a synchronization signal transmitted by a next generation node B (gNB). The method additionally includes receiving, by the UE after transmission of the synchronization signal, a reservation request (RRQ) transmitted by the gNB. The RRQ includes a network allocation vector (NAV) and a control reference signal (RS) for decoding the NAV. The method also includes using the synchronization signal to decode the RRQ.

In another aspect, a wireless communication apparatus has means for detecting, by a user equipment (UE), a synchronization signal transmitted by a next generation node B (gNB). The apparatus additionally includes means for receiving, by the UE after transmission of the synchronization signal, a reservation request (RRQ) transmitted by the gNB, wherein the RRQ includes a network allocation vector (NAV) and a control reference signal (RS) for decoding the NAV. The apparatus also includes means for using the synchronization signal to decode the RRQ.

In another aspect, a wireless communication apparatus includes at least one computer processor and at least one memory coupled to the at least one computer processor. The at least one computer processor is configured to detect, by a user equipment (UE), a synchronization signal transmitted by a next generation node B (gNB). The at least one computer processor is additionally configured to receive, by the UE after transmission of the synchronization signal, a reservation request (RRQ) transmitted by the gNB. The RRQ includes a network allocation vector (NAV) and a control reference signal (RS) for decoding the NAV. The at least one computer processor is also configured to use the synchronization signal to decode the RRQ.

In another aspect, a computer program product includes a computer-readable medium having instructions recorded thereon that, when enacted by one or more computer processors, cause the one or more computer processors to perform procedures. The procedures include detecting, by a user equipment (UE), a synchronization signal transmitted by a next generation node B (gNB). The procedures additionally include receiving, by the UE after transmission of the synchronization signal, a reservation request (RRQ) transmitted by the gNB. The RRQ includes a network allocation vector (NAV) and a control reference signal (RS) for decoding the NAV. The procedures also include using the synchronization signal to decode the RRQ.

In another aspect, a method of wireless communication includes identifying, by a wireless node, one or more wireless signals that need to be transmitted periodically by the wireless node on at least one wireless communication resource. The method additionally includes transmitting, by the wireless node, a reservation signal having a deep preamble to periodically silence other nodes on the at least one wireless communications resource by identifying a length and a periodicity of a periodic transmission to be carried out by the node.

In another aspect, a wireless communication apparatus has means for identifying, by a wireless node, one or more wireless signals that need to be transmitted periodically by the wireless node on at least one wireless communication resource. The apparatus additionally has means for transmitting, by the wireless node, a reservation signal having a deep preamble to periodically silence other nodes on the at least one wireless communications resource by identifying a length and a periodicity of a periodic transmission to be carried out by the node.

In another aspect, a wireless communication apparatus has at least one computer processor and at least one memory coupled to the at least one computer processor. The at least one computer processor is configured to identify, by a wireless node, one or more wireless signals that need to be transmitted periodically by the wireless node on at least one wireless communication resource. The at least one computer processor is additionally configured to transmit, by the wireless node, a reservation signal having a deep preamble to periodically silence other nodes on the at least one wireless communications resource by identifying a length and a periodicity of a periodic transmission to be carried out by the node.

In another aspect, a computer program product includes a computer-readable medium having instructions recorded thereon that, when enacted by one or more computer processors, cause the one or more computer processors to perform procedures. The procedures include identifying, by a wireless node, one or more wireless signals that need to be transmitted periodically by the wireless node on at least one wireless communication resource. The procedures additionally include transmitting, by the wireless node, a reservation signal having a deep preamble to periodically silence other nodes on the at least one wireless communications resource by identifying a length and a periodicity of a periodic transmission to be carried out by the node.

In another aspect, a method of wireless communication includes detecting, by a gNB at power up, at least one reservation signal having a deep preamble and transmitted by at least one wireless node on a wireless communication medium. The method additionally includes determining a network allocation vector (NAV) implicit from the deep preamble. The NAV identifies a length and a periodicity of a periodic transmission to be carried out by the at least one wireless node. The method also includes periodically avoiding contention on the wireless communication medium according to the length and periodicity of the periodic transmission.

In another aspect, a wireless communication apparatus has means for detecting, by a gNB at power up, at least one reservation signal having a deep preamble and transmitted by at least one wireless node on a wireless communication medium. The apparatus additionally has means for determining a network allocation vector (NAV) implicit from the deep preamble. The NAV identifies a length and a periodicity of a periodic transmission to be carried out by the at least one wireless node. The apparatus also has means for periodically avoiding contention on the wireless communication medium according to the length and periodicity of the periodic transmission.

In another aspect, a wireless communication apparatus includes at least one computer processor and at least one memory coupled to the at least one computer processor. The at least one computer processor is configured to detect, by a gNB at power up, at least one reservation signal having a deep preamble and transmitted by at least one wireless node on a wireless communication medium. The at least one computer processor is additionally configured to determine a network allocation vector (NAV) implicit from the deep preamble. The NAV identifies a length and a periodicity of a periodic transmission to be carried out by the at least one wireless node. The at least one computer processor is also configured to periodically avoid contention on the wireless communication medium according to the length and periodicity of the periodic transmission.

In another aspect, a computer program product includes a computer-readable medium having instructions recorded thereon that, when enacted by one or more computer processors, cause the one or more computer processors to perform procedures. The procedures include detecting, by a gNB at power up, at least one reservation signal having a deep preamble and transmitted by at least one wireless node on a wireless communication medium. The procedures additionally include determining a network allocation vector (NAV) implicit from the deep preamble. The NAV identifies a length and a periodicity of a periodic transmission to be carried out by the at least one wireless node. The procedures also includes periodically avoiding contention on the wireless communication medium according to the length and periodicity of the periodic transmission.

In another aspect, a method of wireless communication includes scheduling, by a scheduler of cooperative multipoint (CoMP) cluster, a plurality of next generation node Bs (gNBs) configured as the CoMP cluster in an uncoordinated mode of operation. Each gNB of the CoMP cluster maintains its own network allocation vector (NAV) and contends separately for wireless transmission resources.

In another aspect, a wireless communication apparatus has means for scheduling, by a scheduler of cooperative multipoint (CoMP) cluster, a plurality of next generation node Bs (gNBs) configured as the CoMP cluster in an uncoordinated mode of operation. Each gNB of the CoMP cluster maintains its own network allocation vector (NAV) and contends separately for wireless transmission resources.

In another aspect, a wireless communication apparatus includes at least one computer processor and at least one memory coupled to the at least one processor. The at least one processor is configured to schedule, by a scheduler of cooperative multipoint (CoMP) cluster, a plurality of next generation node Bs (gNBs) configured as the CoMP cluster in an uncoordinated mode of operation. Each gNB of the CoMP cluster maintains its own network allocation vector (NAV) and contends separately for wireless transmission resources.

In another aspect, a computer program product includes a computer-readable medium having instructions recorded thereon that, when enacted by one or more computer processors, cause the one or more computer processors to perform procedures. The procedures include scheduling, by a scheduler of cooperative multipoint (CoMP) cluster, a plurality of next generation node Bs (gNBs) configured as the CoMP cluster in an uncoordinated mode of operation. Each gNB of the CoMP cluster maintains its own network allocation vector (NAV) and contends separately for wireless transmission resources.

In another aspect, a method of wireless communication includes scheduling, by a scheduler of cooperative multipoint (CoMP) cluster, a plurality of next generation node Bs (gNBs) configured as the CoMP cluster in an uncoordinated mode of operation. Exactly one gNB of the CoMP cluster, designated as a cluster head, is running full contention for wireless transmission resources.

In another aspect, a wireless communication apparatus has means for scheduling, by a scheduler of cooperative multipoint (CoMP) cluster, a plurality of next generation node Bs (gNBs) configured as the CoMP cluster in an uncoordinated mode of operation. Exactly one gNB of the CoMP cluster, designated as a cluster head, is running full contention for wireless transmission resources.

In another aspect, a wireless communication apparatus includes at least one computer processor and a memory coupled to the at least one computer processor. The at least one computer processor is configured to schedule, by a scheduler of a cooperative multipoint (CoMP) cluster, a plurality of next generation node Bs (gNBs) configured as the CoMP cluster in an uncoordinated mode of operation. Exactly one gNB of the CoMP cluster, designated as a cluster head, is running full contention for wireless transmission resources.

In another aspect, a computer program product includes a computer-readable medium having instructions recorded thereon that, when enacted by one or more computer processors, cause the one or more computer processors to perform procedures. The procedures include scheduling, by a scheduler of cooperative multipoint (CoMP) cluster, a plurality of next generation node Bs (gNBs) configured as the CoMP cluster in an uncoordinated mode of operation. Exactly one gNB of the CoMP cluster, designated as a cluster head, is running full contention for wireless transmission resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7B is a flow diagram illustrating example blocks of a process carried out by a user equipment according to an aspect of the present disclosure.

FIG. 8A is a flow diagram illustrating example blocks of a process carried out by a gNB according to an aspect of the present disclosure.

FIG. 8B is a flow diagram illustrating example blocks of a process carried out by a user equipment according to an aspect of the present disclosure.

FIG. 9A is a flow diagram illustrating example blocks of a process carried out by a scheduler of a coordinated multipoint cluster according to an aspect of the present disclosure.

FIG. 9B is a flow diagram illustrating example blocks of a process carried out by a scheduler of a coordinated multipoint cluster according to an aspect of the present disclosure.

FIG. 9C is a flow diagram illustrating example blocks of a process carried out by a scheduler of a coordinated multipoint cluster according to an aspect of the present disclosure.

FIG. 9D is a flow diagram illustrating example blocks of a process carried out by a one or more gNBs of a coordinated multipoint cluster according to an aspect of the present disclosure.

DETAILED DESCRIPTION

Figure 1:
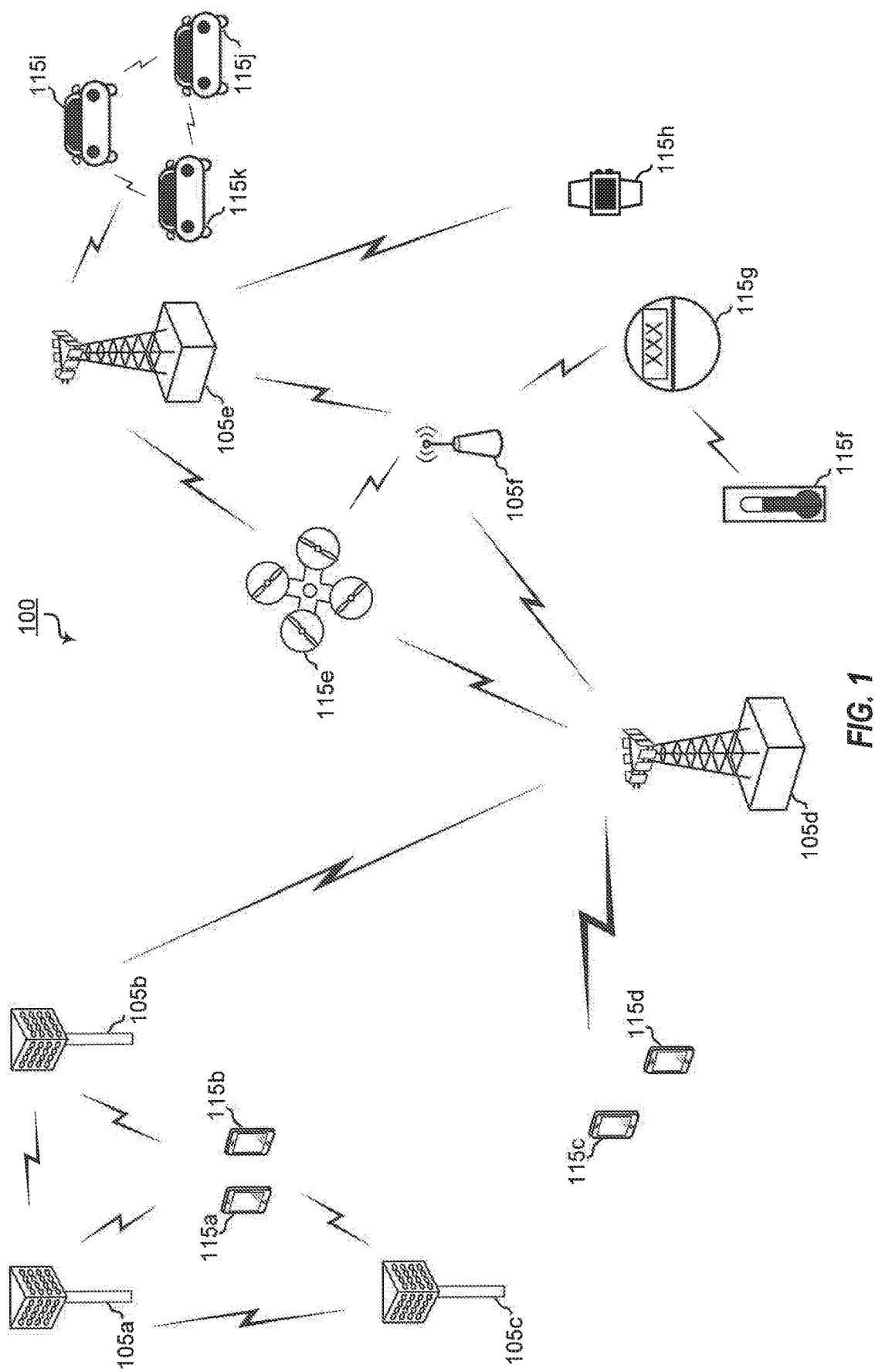
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., 99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
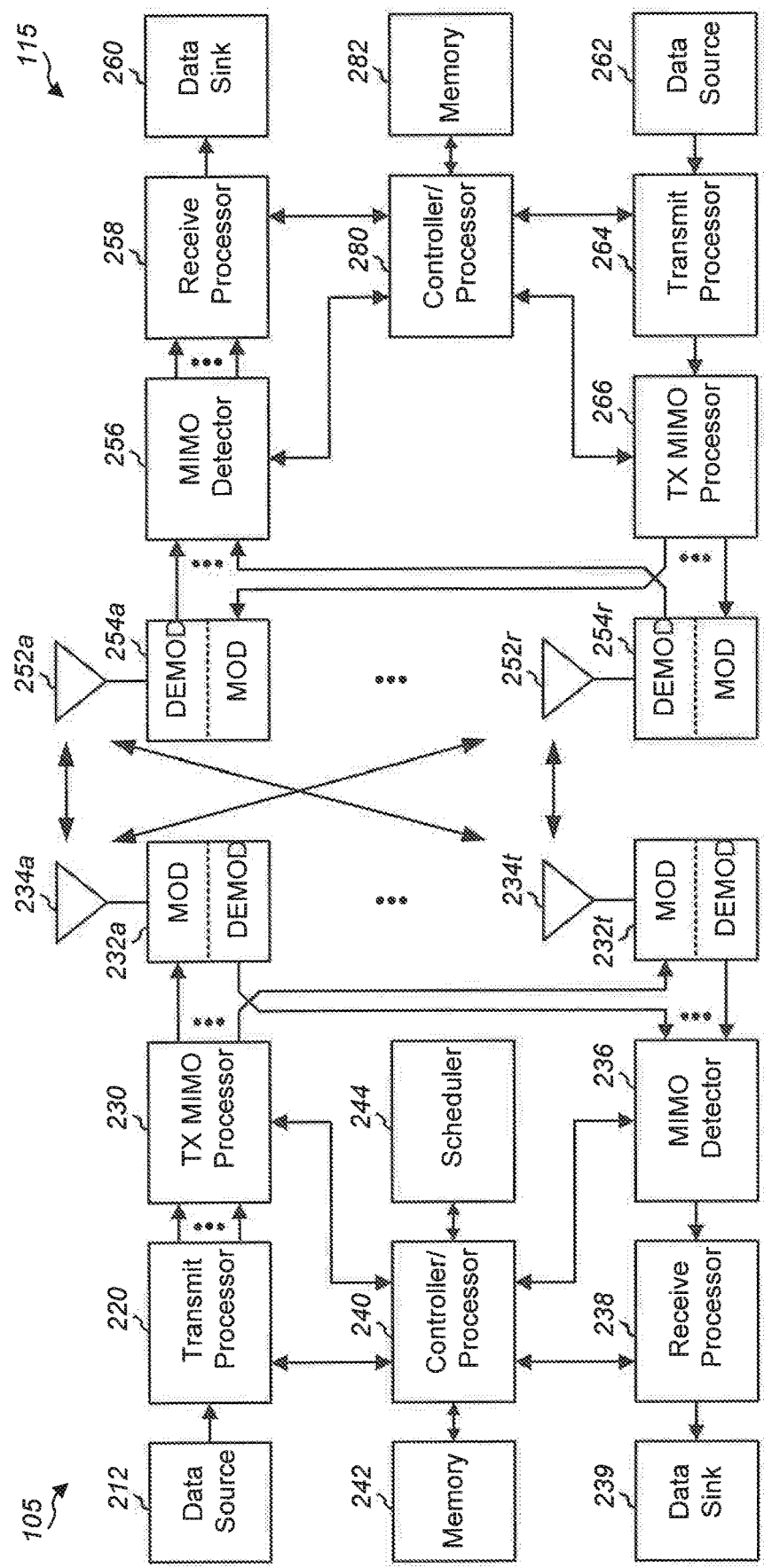
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be preceded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6A, 6B, 6C, 7A, 7B, 8A, 8B, 9A, 9B, 9C, and 9D, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
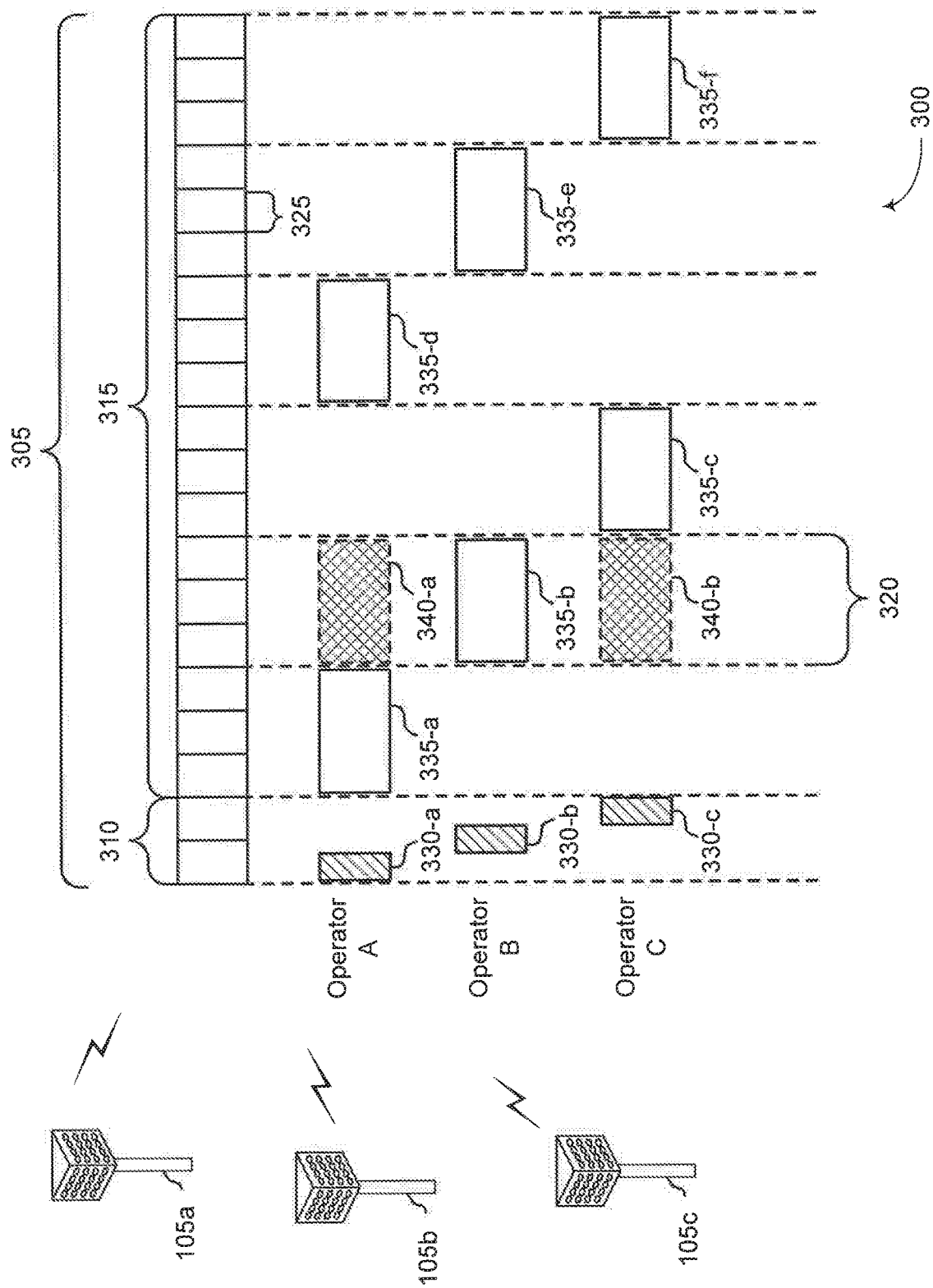
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-NT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-pts for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-pts transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

The present disclosure is directed to a medium reservation framework for coexistence of coordinated and uncoordinated wireless networks in licensed spectrum and shared spectrum. The proposed medium reservation framework organically takes into account operating regimes with different numbers of Tx/Rx antennas per node, provides flexibility in trading off medium contention aggressiveness and power saving, leverages the inherent synchronization nature of NR, and covers both coordinated and uncoordinated operation scenarios. Such uncoordinated operation occurs in networks having different NR operators with network nodes that are not synchronized/coordinated. In contrast, coordinated operation occurs in networks having different NR operators that are synchronized and have a coordination mechanism by fiber backhaul and/or over the air. It is envisioned that the disclosed medium reservation framework can be applied differently for different types of traffic. For example, discovery signals (DRS), paging, and similar procedural messages can be treated with higher protection and more predictable timing for power saving.

Observations from experimentation reveal that, with 4×4 Tx/Rx at eNB/UE, LBT can be relaxed, and energy detection and RTS/CTS mechanisms yield suboptimal results. A statistical analysis shows that a desirable operation regime favors lower MIMO rank and higher spatial reuse. However, reuse 1 is not a robust operation mode. What is needed is a coexistence scheme that organically captures operating with a larger number of antennas.

Figure 4:
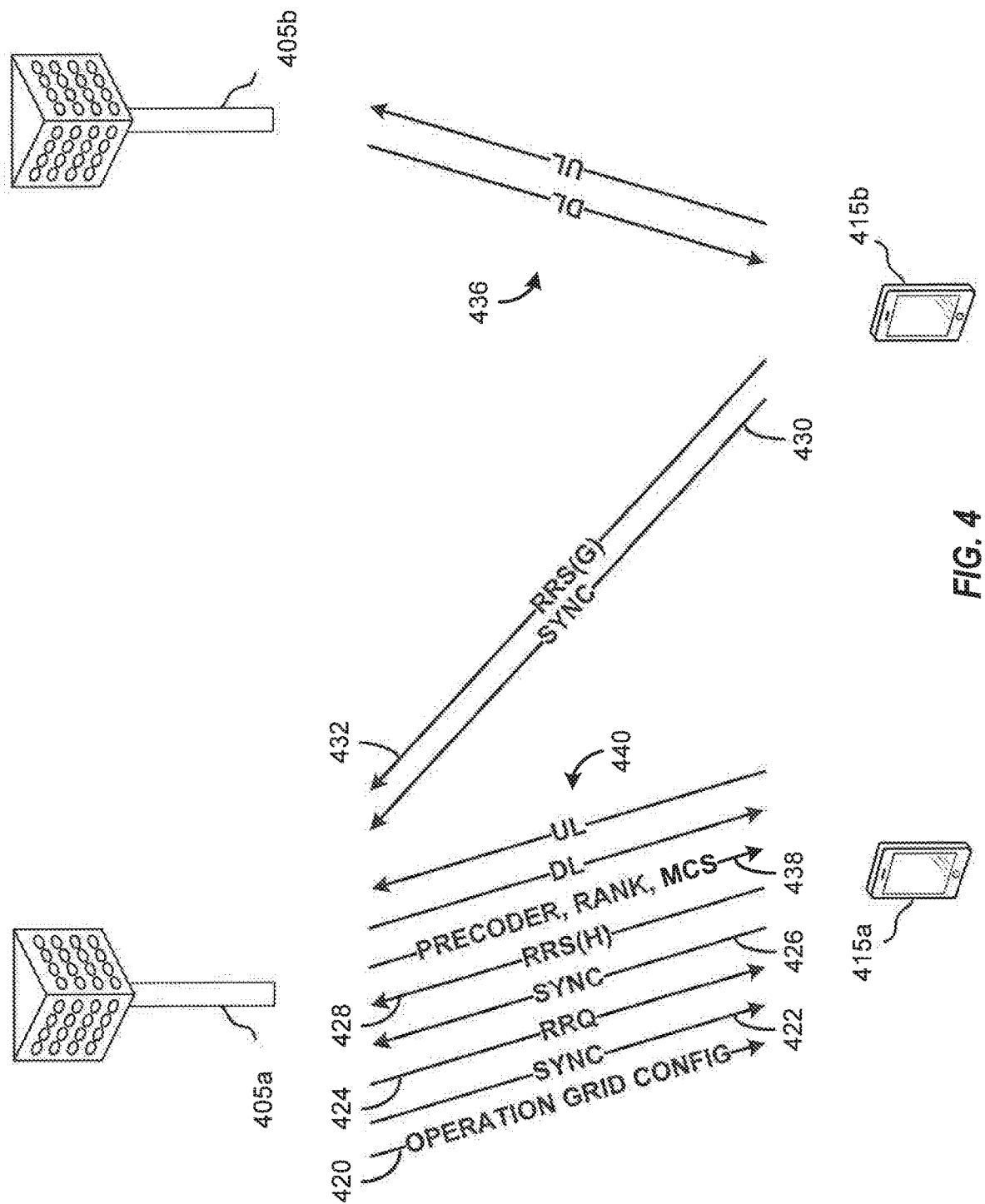
FIG. 4 is a block diagram illustrating message exchange according to a medium reservation framework in an aspect of the present disclosure.

Referring to FIG. 4, the medium reservation framework of the present disclosure may be centered on some basic building blocks, including one or more synchronization signals 422, 426, 430, which may be used for uncoordinated operation to allow different operators to decode each other's reservation messages. Additional basic building blocks of the reservation framework include the reservation messages, such as a reservation request signal (RRQ) 424, and one or more a reservation response signals (RRS) 428, 432.

Figure 5A:
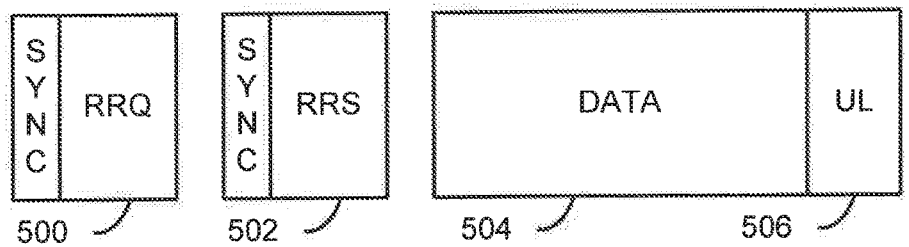
FIG. 5A illustrates an example of a timing diagram for uncoordinated operation according to an aspect of the present disclosure.

Turning to FIG. 5A, an example of operation includes transmission, by a gNB, of a synchronization signal followed by the RRQ. A UE then responds to the RRQ by transmitting another synchronization signal followed by the RRS. Thereafter, data transmissions occur, such as downlink data transmission 504, followed by uplink data transmission 506.

Returning to FIG. 4, it is envisioned that one or more gNBs 405a, 405b may employ an operation grid for exchange of messages, such as the RRQ and RRS. If the RRQ/RRS are continuously floating, such that there is no operation grid or they are merely aligned with operation grid symbol boundaries, then the synchronization signals must be transmitted at −6 dB signal to noise ratio (SNR). However, if the RRQ/RRS are aligned with slot or frame boundaries of an operation grid, then the synchronization signal merely needs to be transmitted at SNR that is above the noise floor. Accordingly, gNB 405a may transit an operation grid configuration 420 to UE 415a that informs the UE 415a of grid characteristics, including whether the RRQ aligns with symbol boundaries, slot boundaries, or a subset of slot boundaries, such as a frame boundary. With this information, the UE can determine whether it only needs to look for the RRQ on the designated boundaries of the grid, and can sleep otherwise. There is a tradeoff involved in that, if the RRQ is merely aligned with symbol boundaries, then the operation is similar to the case of a floating RRQ in that the UE is almost always looking for the RRQ. Thus, the more frequent the potential location for RRQ, the higher the power consumption at the UE side, but there is also a higher chance that the gNB can access the medium. Accordingly, depending on traffic load, throughput requirements, and/or traffic activity of neighbor nodes, the gNB can adapt the RRQ grid. In an isolated cell, for example, the gNB can define the RRQ to be more sparsely allocated by aligning the RRQ with slot or frame boundaries instead of symbol boundaries.

Synchronization signals 422, 426, 430 provide for fast timing and frequency detection by other nodes from different operators that could be potential jammers/victims. Such signals should be detected at a lowest received signal strength indicator (RSSI) level that can be considered as interference. If the RRQ aligns with symbol boundaries, the UE/gNB from the same operator does not need to decode this sync signal, which presents an advantage compared to WiFi™. The synchronization signal 422 preceding the RRQ 424 can be extended until a next symbol boundary, such that its duration can be longer than a duration of the synchronization signal 426 for RRS 428.

Regarding the synchronization signal detection threshold, 0 dB SNR should be conservative enough for detecting synchronization signals because it is not necessary to silence interference below the noise floor. However, for the case that RRQ 424 is continuously floating, the synchronization signal 422 needs to be detected by the UE/gNBs from the same operator. In this case, a −6 dB detection threshold is needed. It is envisioned that the sync signal needs to be similar to a radio wake-up signal for minimal power consumption. The gNB can make a decision on the detection threshold after PHY scoping for waveform design and decoder complexity/timeline.

For uncoordinated operation, the RRQ 424 detection threshold is −6 dB detection, similarly to PDCCH, because it needs to be detected by UEs from the same operator/network/gNB. The RRQ functions to trigger UEs 415a, 415b to send RRS 428, 432. The RRQ 424 carries a network allocation vector (NAV) that provides a transmission opportunity (TxOp) duration, and that may be implemented as a 4 bit message to reserve up to 16 slots, plus an 8 bit cell reference signal (CRS) and approximately QPSK 1/3→18 reference signal (RS) tones. These RS tones may be used, by UEs 415a and 415b, in decoding the NAV and calculating a coarse interference covariance matrix (Rnn). In some aspects, it is envisioned that the RRQ may also include a pre-coded channel state information (CSI)-RS that can convey rank to be used in a data portion of a transmission exchanged between gNB 405a and UE 415a. This CSI-RS may be used by other nodes, such as UE 415b, in their Rnn estimation. For example, the UE 415b can use the CSI-RS to determine a modulation and coding scheme (MCS) for each layer and include this information as feedback in the RRS 432 so that gNB 405a may use that information for beamforming selection. However, this CSI-RS is potentially needed more for coordinated operation as described later.

Further with respect to the uncoordinated operation, detection of the RRS signals 428, 432 needs to occur at −6 dB SNR. The RRS functions to carry a precoded sounding reference signal (SRS) modulated by an indication of interference estimated by the UE. It is envisioned that the precoded SRS may be modulated only by interference power. However, it is presently preferred to modulate the precoded SRS by an inverse of the coarse interference covariance matrix ($Rnn^{1/2}$). The RRS also carries a NAV and a control RS for NAV decoding. The gNB 405a receives RRS 428 that has $Rnn^{-1/2}$ H from its served UE 415a, where H is the channel estimate formula for estimation of the channel between gNB 405a and UE 415a. This implementation communicates effective signal to interference noise ratio (SINR) post minimum mean square error (MMSE) and can be leveraged for selection of precoder, rank, and MCS 438, for which accuracy depends the Rnn being up to date. The gNB 405a also receives RRS 432 that has $Rnn^{-1/2}$ n G, where G is the channel estimate formula for estimation of the channel between gNB 405a, as a jammer, and UE 415b, as a victim receiver. This implementation communicates to gNB 405a an interference contribution compared to nominal at UE 415b. In a special case that Rnn corresponds to white noise, $Rnn^{-1/2}$ G reduces to $|G|/\sigma_n^2$, which is the additional rise in interference level, to wireless communication 436 between UE 415b and its serving gNB 405b, that is attributable to of transmissions 440 of gNB 405a, which allows gNB 405a to reduce transmission power, if needed. In general, for colored Rnn, gNB 405a can receive, from UE 415b, the equivalence of $|G|^2/\sigma_n^2$ per spatial dimension, which allows gNB 405a to reduce rank dimension in addition to transmission power, if needed.

It is envisioned that the UE 415a and UE 415b can each calculate its respective Rnn over the RS tones in RRQ 424. If UE 415a and/or 415b can predict interference variation within the TxOp, then the respective Rnn calculation can take this prediction into account. Accordingly, RNN can potentially be used for interference prediction. Also, if data (NAV) cannot be frequency division multiplexed with SRS, then RRS 428, 432 may need to be two symbols.

Regarding component carrier aggregation (CCA) rules in relation to the disclosed medium reservation framework, pre-coded SRS transmission can be thought of as power controlling the RRS signal. For example, if a node cannot allow high interference, it can transmit with higher power (e.g. cell edge). Conversely, if a node can allow high interference, it can transmit with lower power (e.g. cell center). A neighbor gNB can look into the eigenvalues of $Rnn^{-1/2}$ G, compare them to a threshold, and decide on its transmission rank and its transmission power per layer. Such a threshold may be defined in a wireless communications standard and define allowable interference rise.

Figure 5B:
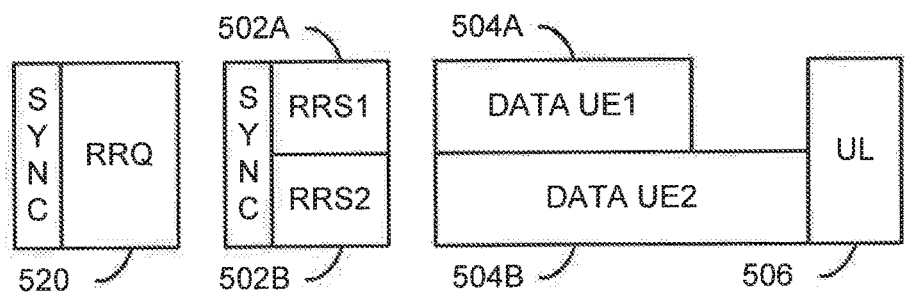
FIG. 5B illustrates an example of a timing diagram for multiplexing of reservation response signals in a transmission opportunity according to an aspect of the present disclosure.

Turning to FIG. 5B, it is envisioned that RRS from two or more UEs may be multiplexed in the TxOp. One way to enable UE multiplexing in the TxOp is for RRS 502A and 502B from different UEs to be frequency division multiplexed (FDMed). This implementation can be paired with FDM for the UE data 504A and 504B. Different UEs can have different NAV duration depending on the resources allocated in RRQ 520. An alternative is to multiplex UEs in the time domain, which requires dividing the TxOp into smaller TxOps such that a link is not over reserving the medium.

For uplink (UL) traffic in the uncoordinated operation, another RRQ may be used that can act as an RRS to reserve the medium for UL. UE multiplexing is straightforward in this case, whether TDM or FDM, because the gNB is the common receiver in the UL case. For such an implementation, switching traffic direction within the TxOp (e.g. DL/UL decided on a per slot basis), may require using different RRQ/RRS signaling for each portion. A conservative approach may be to reserve the medium from both the RRQ and RRS at the start of the TxOp. This approach may enable more scheduler flexibility, especially if supporting ultra-reliable and low latency communication (URLLC), while impacting overall network efficiency.

In some implementations, it is envisioned that, for uncoordinated operation, different protection regimes may be employed by using a deep preamble. For example, for discovery signals, before paging, and for important messages, a deep reservation signal can be sent that can silence potential jammers for the UEs associated with the gNB. For this case, a synchronization signal may also need to be detected at −6 dB SNR. Accordingly, a deep preamble may be used for less frequent messages that is a specific preamble that can be detected at very low levels (e.g., −10 dB SNR to protect from hidden nodes). A NAV may be implicit from the preamble, and to reduce hypothesis testing, the implicit NAV may convey few NAV durations (e.g., 1 slot, 2 slots). To allow single CCA contention for these less frequent signals, gNBs can, at power up, listen to the medium, identify locations of these deep preambles, and periodically avoid contention in these locations.

Rate control in uncoordinated operation may be an issue due to mismatch between Rnn feedback on RRS and interference seen on data. One way to mitigate this mismatch between predicted and actual interference may be to update Rnn/MCS feedback with precoded SRS sent within the TxOp. Alternatively or additionally, enhancements may be made to outer loop rank control compared to 10% packet error rate (PER) target.

Figure 5C:
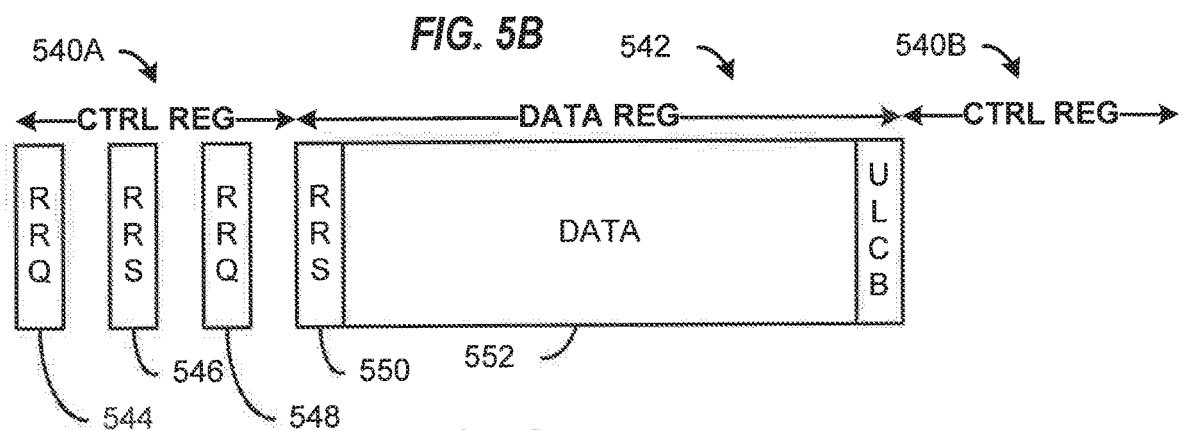
FIG. 5C illustrates an example of a timing diagram for coordinated operation according to an aspect of the present disclosure.

Referring to FIG. 5C, coordinated operation enjoys the benefit that synchronization signals are not needed. Otherwise, the medium reservation framework may leverage the same RRQ/RRS design described above for uncoordinated operation. Reservation, however, mainly occurs in a control region 540A, 540B to avoid data over control interference and provide higher robustness. It is envisioned that the control region may be dimensioned for a few operators (e.g., 2). Thus, an RRQ 544 and RRS 546 for a primary operator and an RRQ 548 and RRS 550 for a secondary operator may be exchanged in the control region 540A, while other operators may only contend in the data region 542 if they do not detect RRQ/RRS in the control region. Priority based contention (contention window size) may be implemented with higher priority for the primary and secondary operators, and the remaining operators may be accorded equal and lower priority.

It is envisioned that measures may be taken to allow other nodes to calculate Rnn from RRQ and minimize mismatch between interference seen on RRQ and data. For example, and as previously mentioned, the RRQ may carry a pre-coded CSI-RS that can have similar rank to a rank that the gNB intends to use for data 552 (although this can still be adjusted based on UE feedback in RRS/CSI). It is envisioned that a residual mismatch may be handled by outer loop rank control. This CSI-RS is less necessary in uncoordinated operation because the RRQ will potentially already see interference from data of other nodes.

Figure 5D:
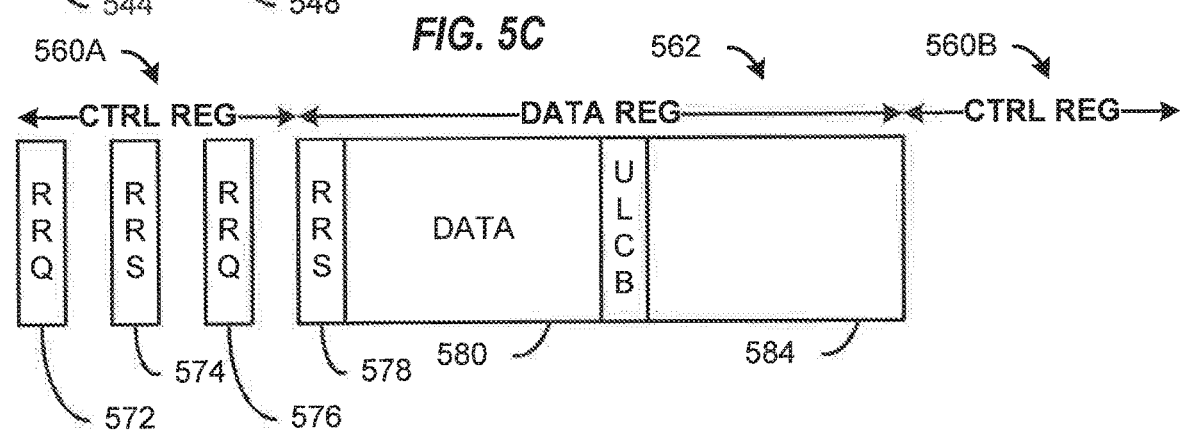
FIG. 5D illustrates an example of a timing diagram for coordinated operation with prioritized random access in a remainder of a transmission opportunity according to an aspect of the present disclosure.

Referring to FIG. 5D, it is envisioned that, if a gNB does not have enough data 580 to fill the data region 562 of the TxOp, then other gNBs that saw the NAV in RRQ/RRS 572, 574, 576, 578 of control region 560A can contend for the remainder 584 of the data region 562 of the TxOp. This contention mechanism may use prioritized random access between those gNBs to reduce collision. However, this opportunistic transmission should end before the start of next control region 560B. Moreover, for gNBs of a same operator, soft reuse can be achieved in the data region either through random contention between colors or individual nodes using same RRQ/RRS formats. Here, there is a tradeoff with self-optimizing network (SON) complexity, in that a more sophisticated SON is needed to contend at the color level. Also, reuse 1 is special case.

Regarding coordinated multipoint (CoMP) in the uncoordinated mode of operation, there are two options envisioned for configuration of CoMP clusters. One option is for each node in the cluster to contend separately and maintain its own NAV. Thus, at any time instant, it is a scheduler choice whether to use the nodes with current NAV expired or to use the largest NAV and wait. Preferentially scheduling the nodes with the current NAV expired requires a smaller cluster size, but provides a higher chance for a gNB to access the medium. However, preferentially scheduling the largest NAV allows a larger cluster size, but increases the risk of a gNB losing the medium. It is envisioned that these scheduling choices may be combined in a variety of ways. Another option is for only one node in the cluster to be running full contention, and the scheduler may designate this node as a cluster head. When the cluster head clears the medium, it may send RRQ and the rest of the nodes in the cluster may respond to this RRQ, only if they determine that their additional transmissions will avoid exceeding a predetermined interference level threshold, by sending a message, referred to herein as a CoMP RRS, to indicate that they can join the cluster. It is envisioned that the head of the cluster can be changed dynamically using, for example, a fairness mechanism that can be based on cluster size. An advantage of this option is a larger cluster size, but at the expense of potentially creating more interference. These pros and cons can be equalized with less access to the medium based on medium utilization, such as by using concepts from carrier sensing adaptive transmission (CSAT).

Figures 6A, 6B:
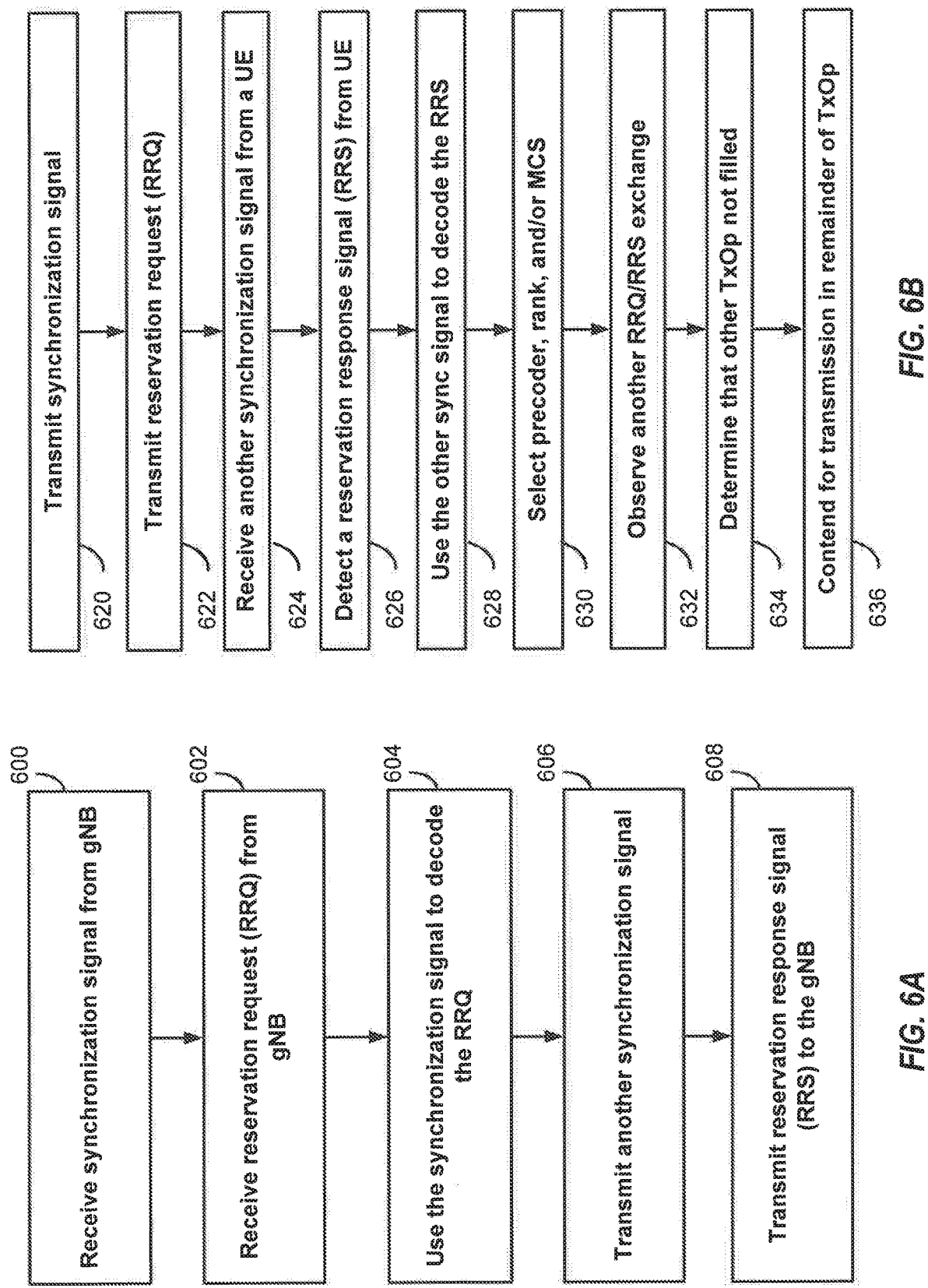
FIG. 6A is a flow diagram illustrating example blocks of a process carried out by a user equipment according to an aspect of the present disclosure.
FIG. 6B is a flow diagram illustrating example blocks of a process carried out by a serving gNB according to an aspect of the present disclosure.

Turning to FIG. 6A, a process carried out by a UE may begin, at block 600, with receiving, at the UE, a synchronization signal transmitted by a gNB. Processing may proceed, at block 602, by receiving, at the UE after receiving the synchronization signal, RRQ transmitted by the gNB. The RRQ may include a NAV and a control RS that enables decoding of the NAV. It is envisioned that, in some instances, the RRQ also includes a precoded CSI-RS that conveys rank used in a data portion of wireless communication between the UE to a serving gNB, and that facilitates calculation of Rnn by the UE. Processing may then proceed, at block 604, by using, by the UE, the synchronization signal to decode the RRQ. Processing may then proceed, at block 606, by transmitting, by the UE, another synchronization signal. Processing may then proceed, at block 608, by transmitting, by the UE in response to the RRQ and after transmitting the other synchronization signal, RRS. In some implementations, the UE may determine whether the RRQ is received in a control region and, in response to the determination being that the RRQ is received in the control region, the UE may transmit the RRS in the control region. Otherwise, in response to the determination being that the RRQ is not received in the control region, the UE may transmit the RRS in a data region. The RRS may include a NAV and a control RS that enables decoding of the NAV. It is envisioned that, in some instances, the RRS may be multiplexed, in a TxOp identified by the NAV, with other RRSs transmitted by other UEs. The RRS carries a precoded SRS modulated by an indication of interference estimated by the UE. Preferably, the indication of interference corresponds to $Rnn^{-1/2}$. In the case that the gNB is a serving gNB that serves the UE, the $Rnn^{-1/2}$ communicates effective SINR post MMSE for wireless communication between the UE and the serving gNB. In the case that the gNB is a neighbor gNB that does not serve the UE, the $Rnn^{-1/2}$ communicates a rise in interference level, to wireless communication between the UE and a serving gNB, that is attributable to transmission by the neighbor gNB. In some instances, such as for colored noise, the $Rnn^{-1/2}$ includes an equivalence, per spatial dimension, of the rise in interference level, thereby enabling the neighbor gNB to determine transmission rank and transmission power per layer in a manner that avoids exceeding a predetermined interference level threshold.

Referring to FIG. 6B, a process carried out by a serving gNB may begin, at block 620, by transmitting, by the gNB, a synchronization signal. Processing may then proceed, at block 622, by transmitting, by the gNB to a UE, RRQ. The RRQ may include a NAV and a control RS that enables decoding of the NAV. In some instances, the RRQ may include a precoded CSI-RS that conveys rank used in a data portion of wireless communication between the UE and the gNB, and that facilitates calculation of Rnn by the UE. It is also envisioned that the gNB may transmit different RRQs to reserve one or more communication media for uplink and downlink traffic. Processing may then proceed, at block 624, by receiving, by the gNB, another synchronization signal transmitted by the UE. Processing may then proceed, at block 626, by detecting, by the gNB, RRS transmitted by the UE in response to the RRQ, wherein the RRS includes a precoded SRS modulated by an indication of interference estimated by the UE. Preferably, the indication of interference corresponds to $Rnn^{-1/2}$. It is envisioned that the gNB detects the RRS at −6 decibels (dB) signal to noise ratio (SNR). In some instances, the gNB may detect the RRS that is multiplexed, in a TxOp identified by the NAV, with other RRSs transmitted by other UEs. Processing may then proceed, at block 628, by using, by the gNB, the other synchronization signal to decode the RRS. Processing may then proceed, at block 630, by employing the indication of interference to select, for wireless communication between the UE and the gNB, a precoder, a rank, and/or MCS. In the event that the gNB is synchronized with another gNB, processing may proceed, at block 632, by observing, by the gNB, another RRQ and another RRS exchanged between the other eNB and another UE served by the other UE in a control region. Processing may then proceed, at block 634, by determining, by the gNB, that the other gNB does not have enough data to fill a TxOp identified by the other RRQ and the other RRS. Processing may then proceed, at block 636, by contending for transmission, by the gNB, in a remainder of the TxOp. If the gNB and the other gNB are of a same operator, then the contending may occur according to a soft reuse procedure that employs a mechanism involving exchange of RRQ and RRS. Otherwise, if the gNB and the other gNB are of different operators, then the contending may occur according to a prioritized random access procedure with one or more gNBs of other operators.

Figure 6C:
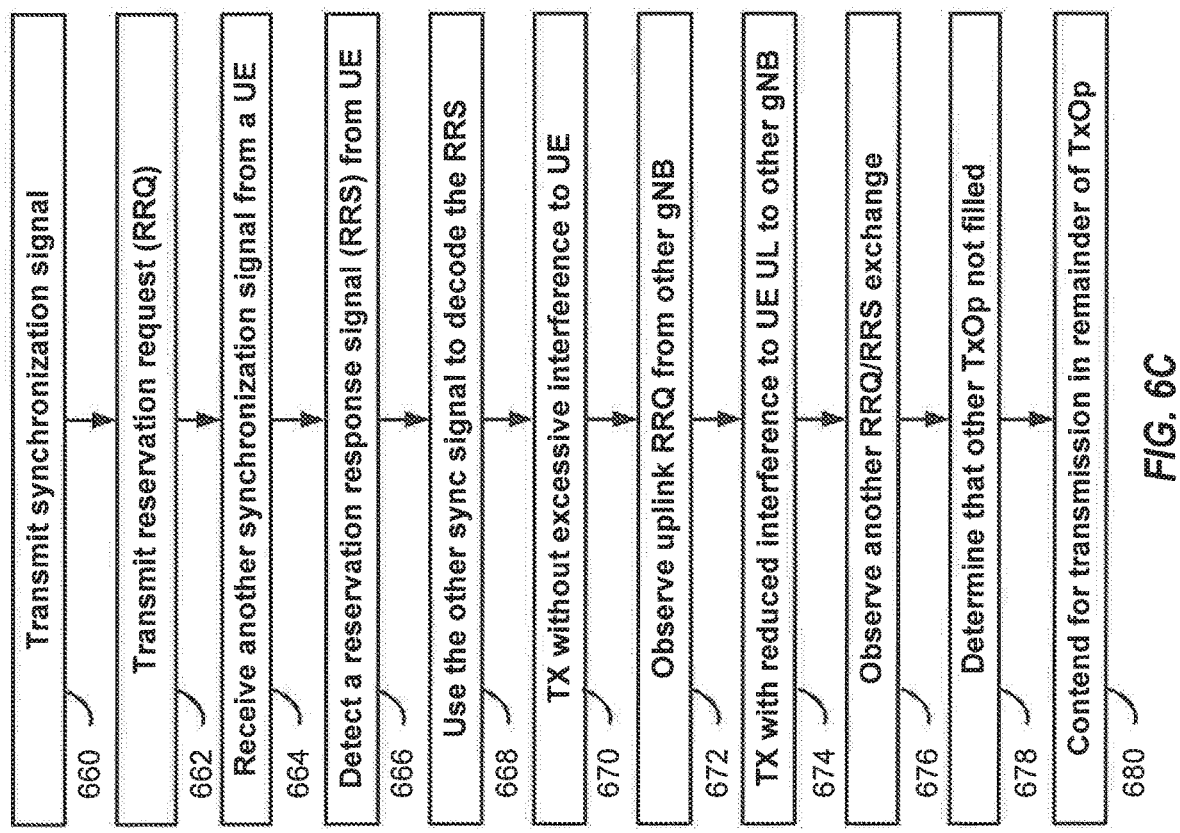
FIG. 6C is a flow diagram illustrating example blocks of a process carried out by a neighbor gNB according to an aspect of the present disclosure.

Turning to FIG. 6C, processing carried out by a neighbor gNB may begin, at block 660, by transmitting, by the gNB, a synchronization signal. Processing may then proceed, at block 662, by transmitting, by the gNB to a UE, RRQ. The RRQ may include a NAV and a control RS that enables decoding of the NAV. In some cases, the RRQ may include a precoded CSI-RS that conveys tones over which the UE should calculate Rnn. Processing may then proceed, at block 664, by receiving, by the gNB, another synchronization signal transmitted by the UE. Processing may then proceed, at block 666, by detecting, by the gNB, RRS transmitted by the UE in response to the RRQ. The gNB detects the RRS at −6 dB SNR. Detecting, by the gNB, the RRS transmitted by the UE may include detecting the RRS that is multiplexed, in a TxOp identified by the NAV, with other RRSs transmitted by other UEs. The RRS includes a precoded SRS modulated by an indication of interference estimated by the UE. The indication of interference communicates a rise in interference level, to wireless communications between the UE and a serving gNB thereof, that is attributable to one or more wireless transmissions by the gNB. Preferably, the indication of interference corresponds to $Rnn^{-1/2}$. In some cases, such as for colored noise, the $Rnn^{-1/2}$ a includes an equivalence, per spatial dimension, of the rise in interference level. Processing may then proceed, at block 668, by using, by the gNB, the other synchronization signal to decode the RRS. Processing may then proceed, at block 670, by transmitting, by the gNB in response to the RRS, the wireless transmissions in a manner that avoids causing interference to the wireless communications that exceeds a predetermined interference level threshold. In the event that the $Rnn^{-1/2}$ includes an equivalence, per spatial dimension, of the rise in interference level, the gNB may determine a transmission rank and transmission power per layer in a manner that avoids exceeding the predetermined interference level threshold. Processing may then proceed, at block 672, by detecting, by the gNB, RRQ transmitted by a serving gNB of the UE to reserve a communication medium for uplink transmission by the UE to the serving gNB. Processing may then proceed, at block 674, by transmitting, by the gNB in response to the RRQ, the wireless transmissions in a manner that reduces interference to the uplink transmission by the UE. It is envisioned that a subsequently received RRS from the UE may trigger further reduction of transmission power and or rank by the gNB. In the event that the gNB is synchronized with another gNB, processing may proceed, at block 676, by observing, by the gNB, another RRQ and another RRS exchanged between the other eNB and another UE served by the other UE in a control region. Processing may then proceed, at block 678, by determining, by the gNB, that the other gNB does not have enough data to fill a TxOp identified by the other RRQ and the other RRS. Processing may then proceed, at block 680, by contending for transmission, by the gNB, in a remainder of the TxOp. If the gNB and the other gNB are of a same operator, then the contending may occur according to a soft reuse procedure that employs a mechanism involving exchange of RRQ and RRS. Otherwise, if the gNB and the other gNB are of different operators, then the contending may occur according to a prioritized random access procedure with one or more gNBs of other operators.

Figure 7A:
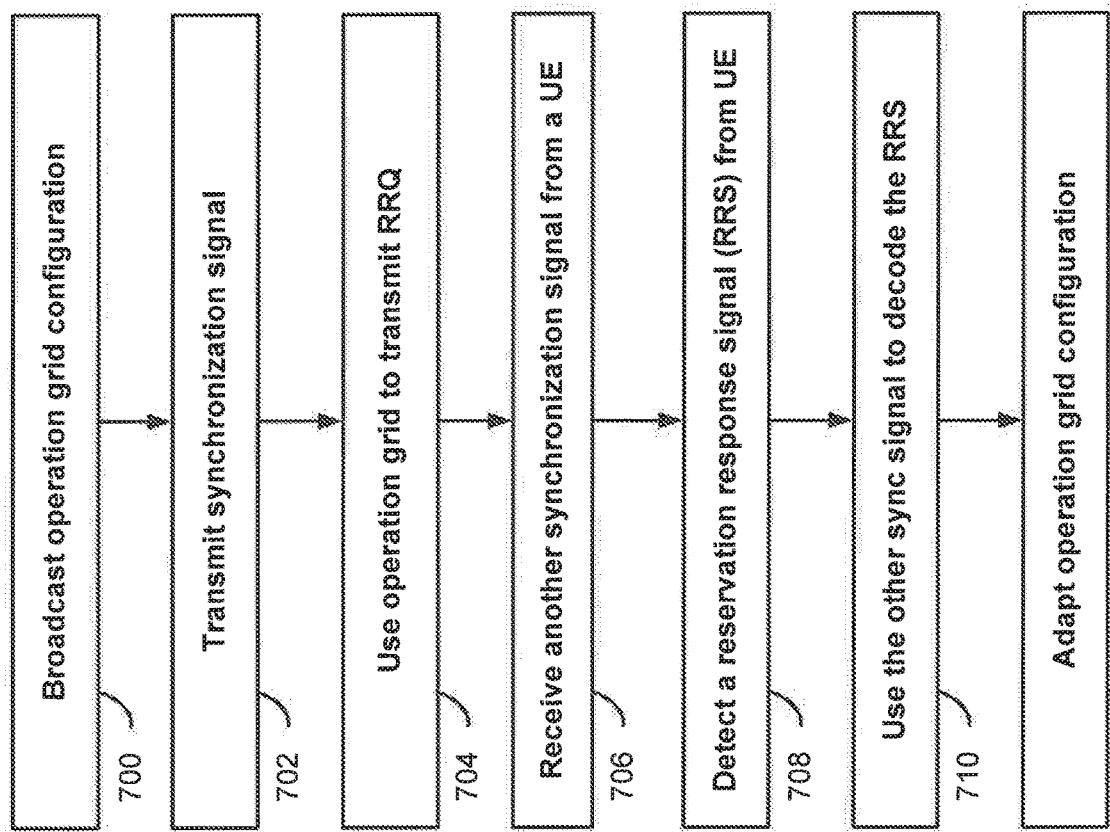
FIG. 7A is a flow diagram illustrating example blocks of a process carried out by a gNB according to an aspect of the present disclosure.

Referring to FIG. 7A, a process carried out by a gNB may begin, at block 700, by broadcasting an operation grid for one or more UEs. It is envisioned that the operation grid may be common to an entire network of two or more gNBs. Processing may then proceed, at block 702, by transmitting, by a gNB, a synchronization signal. Processing may then proceed, at block 704, by transmitting, by the gNB after transmission of the synchronization signal, RRQ. The RRQ may be aligned with one or more slot boundaries and/or one or more frame boundaries of the operation grid, in which case the gNB may transmit the synchronization signal at 0 dB SNR at block 702. Otherwise, if the RRQ is continuously floating or aligned with symbol boundaries, the gNB may transmit the synchronization signal at −6 dB SNR at block 702. The RRQ may include a NAV and a control RS for decoding the NAV, and the synchronization signal may enable one or more other nodes not coordinated with the gNB to decode the RRQ. Processing may then proceed, at block 706, by detecting, by the gNB, a synchronization signal transmitted by a UE. Processing may then proceed, at block 708, by receiving, by the gNB after transmission of the synchronization signal, RRS transmitted by the UE in response to the RRQ. Processing may then proceed, at block 710, by using, by the gNB, the synchronization signal to decode the RRS. Processing may then proceed, at block 712, by adapting the operation grid based on at least one of traffic load, throughput requirements, or traffic activity of neighbor nodes.

Turning to FIG. 7B, a process carried out by a UE may begin, at block 750, by receiving, by the UE, an operation grid broadcast by a gNB. If the RRQ is continuously floating or aligned with symbol boundaries of the operation grid, then processing may skip to block 756. Otherwise, if the RRQ is aligned with at least one of one or more slot boundaries or one or more frame boundaries of the operation grid, then processing may then proceed, at block 752, by sleeping, by the UE, at one or more times not proximate to occurrences of grid boundaries. Processing may then proceed, at block 754, by waking up, by the UE, proximate in time to occurrences of grid boundaries. Processing may then proceed, at block 756, by detecting, by the UE, a synchronization signal transmitted by a gNB. If the RRQ is continuously floating or aligned with symbol boundaries of the operation grid, then the UE may detect the synchronization signal at −6 dB SNR. Otherwise, if the RRQ is aligned with at least one of one or more slot boundaries or one or more frame boundaries of the operation grid, then the UE detects the synchronization signal at 0 dB signal to noise ratio (SNR). Processing may then proceed, at block 758, by receiving, by the UE after transmission of the synchronization signal, RRQ transmitted by the gNB. The RRQ may include a NAV and a control RS for decoding the NAV. Processing may then proceed, at block 760, by using the synchronization signal to decode the RRQ. Processing may then proceed, at block 762, by transmitting, by the UE in response to the RRQ, a synchronization signal. Processing may then proceed, at block 764, by transmitting RRS in response to the RRQ. The synchronization signal may enable one or more other nodes not coordinated with the UE to decode the RRS.

Referring to FIG. 8A, a process carried out by a gNB may begin, at block 800, by identifying, by a wireless node, one or more wireless signals, such as a discovery signal or a paging occasion, that need to be transmitted periodically by the wireless node on at least one wireless communication resource. Processing may then proceed, at block 802, by transmitting, by the wireless node, a reservation signal having a deep preamble to periodically silence other nodes on the at least one wireless communications resource by identifying a length and a periodicity of a periodic transmission to be carried out by the node. The preamble may be transmitted at −10 dB SNR and/or at least one NAV may be implicit from the deep preamble. It is envisioned that durations of all NAVs implicit from the deep preamble may be limited to no more than two slots.

Referring to FIG. 8B, a process carried out by a user equipment may begin, at block 850, by detecting, by a gNB at power up, at least one reservation signal having a deep preamble and transmitted by at least one wireless node on a wireless communication medium. The preamble may be detected at −10 dB SNR. Processing may then proceed, at block 852, by determining a NAV implicit from the deep preamble, wherein the NAV identifies a length and a periodicity of a periodic transmission to be carried out by the at least one wireless node. It is envisioned that durations of all NAVs implicit from the deep preamble are limited to no more than two slots. Processing may then proceed, at block 854, by periodically avoiding contention on the wireless communication medium according to the length and periodicity of the wireless transmission.

Turning to FIG. 9A, a process carried out by a scheduler of a CoMP cluster may begin, at block 900, by scheduling, by the scheduler of the CoMP cluster, a plurality of gNBs configured as the CoMP cluster in an uncoordinated mode of operation. Each gNB of the CoMP cluster maintains its own NAV and contends separately for wireless transmission resources. Processing may proceed, at block 902, by the scheduler of the CoMP cluster preferentially scheduling gNBs of the CoMP cluster having currently expired NAVs.

Referring to FIG. 9B, a process carried out by a scheduler of a CoMP cluster may begin, at block 900, by scheduling, by the scheduler of the CoMP cluster, a plurality of gNBs configured as the CoMP cluster in an uncoordinated mode of operation. Each gNB of the CoMP cluster maintains its own NAV and contends separately for wireless transmission resources. Processing may proceed, at block 902, by the scheduler of the CoMP cluster preferentially scheduling gNBs of the CoMP cluster having a largest NAV.

Referring to FIG. 9C, a process carried out by a scheduler of a coordinated multipoint cluster may begin, at block 950, by scheduling, by the scheduler of the CoMP cluster, a plurality of gNBs configured as the CoMP cluster in an uncoordinated mode of operation. Exactly one gNB of the CoMP cluster, designated as a cluster head, is running full contention for wireless transmission resources. The cluster head sends RRQ when it clears the wireless transmission resources, and other gNBs of the CoMP cluster respond with RRS only if a determination is made, by the other gNBs, that one or more transmissions by the other gNBs avoids exceeding a predetermined interference level threshold. Processing may then proceed, at block 952, by the scheduler of the CoMP cluster dynamically changing which gNB of the CoMP cluster is designated as the cluster head. The designation of the cluster head may be based on a fairness mechanism that is based on cluster size.

Referring to FIG. 9D, a process carried out by a one or more gNBs of a coordinated multipoint cluster may begin, at block 970, by the gNB receiving RRQ transmitted by a gNB of the CoMP cluster, when it clears resources, that is designated as the cluster head. Processing may then proceed, at block 972, by the gNB determining whether its transmissions will avoid exceeding a predetermined interference level threshold. Processing may then proceed, at block 974, by the gNB transmitting RRS only if it determines, at block 972, that its transmissions will avoid exceeding the predetermined interference level threshold.

Figure 10:
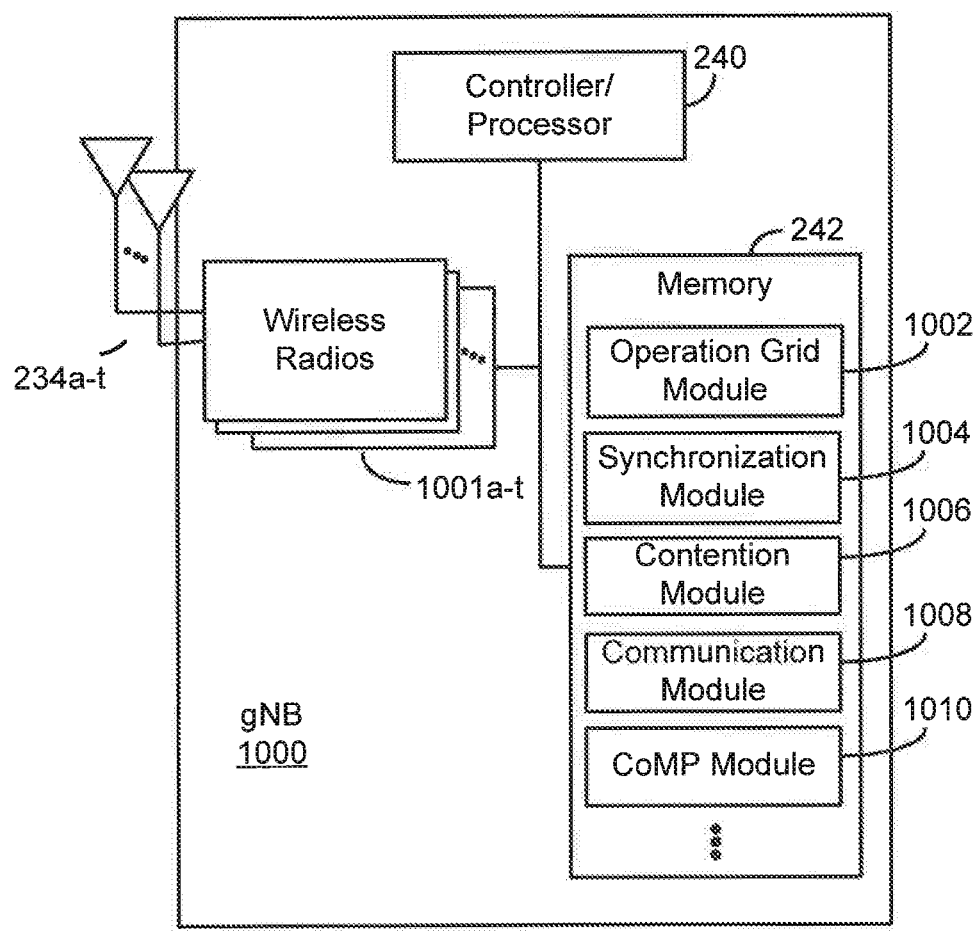
FIG. 10 is a block diagram illustrating components of a gNB according to one or more aspects of the present disclosure.

Turning to FIG. 10, a gNB 1000 may have the same or similar configuration as the configuration of base station 105, as illustrated in FIGS. 1 and 2, and/or gNBs 405a and 405b of FIG. 4. The gNB 1000 may include controller/processor 240 to perform or direct the execution of various processes or program codes stored in memory 242. gNB 1000 may further include wireless radios 1001a-t to process uplink or downlink signals received from antennas 234a-t. Memory 242 may store program codes for execution of operation grid module 1002, synchronization module 1004, contention module 1006, communication module 1008, CoMP module 1010, or other modules/applications by controller/processor 240.

Operation grid module 1002, when enacted by controller/processor 240, may configure controller/processor 240 to perform procedures in accordance with broadcasting, using, and adapting an operation grid, as described above with reference to FIGS. 4, 7A, and 7B. Synchronization module 1004, when enacted by controller/processor 240, may configure controller/processor 240 to perform procedures in accordance with transmission, detection, and use of synchronization signals, as described above with reference to FIGS. 4, 5A, 5B, 5C, 5D, 6A, 6B, 6C, 7A, and 7B. Contention module 1006, when enacted by controller/processor 240, may configure controller/processor 240 to perform procedures in accordance with generation, transmission, receipt, and use of contention messages, as described above with reference to FIGS. 4, 5A, 5B, 5C, 5D, 6A, 6B, 6C, 7A, 7B, 9A, 9B, 9C, and 9D. Communication module 1008, when enacted by controller/processor 240, may configure controller/processor 240 to perform procedures in accordance with precoder, rank, and/or MCS selection, DL TX, UL RX, power reduction, rank reduction, and deep preamble generation and transmission as described above with respect to FIGS. 4, 5A, 5B, 5C, 5D, 6B, 6C, 8A, and 8B. CoMP module 1010, when enacted by controller/processor 240, may configure controller/processor 240 to perform procedures in accordance with preferentially scheduling gNBs, dynamically designating cluster heads, and performing CoMP transmissions as described above with reference to FIGS. 9A, 9B, 9C, and 9D.

Figure 11:
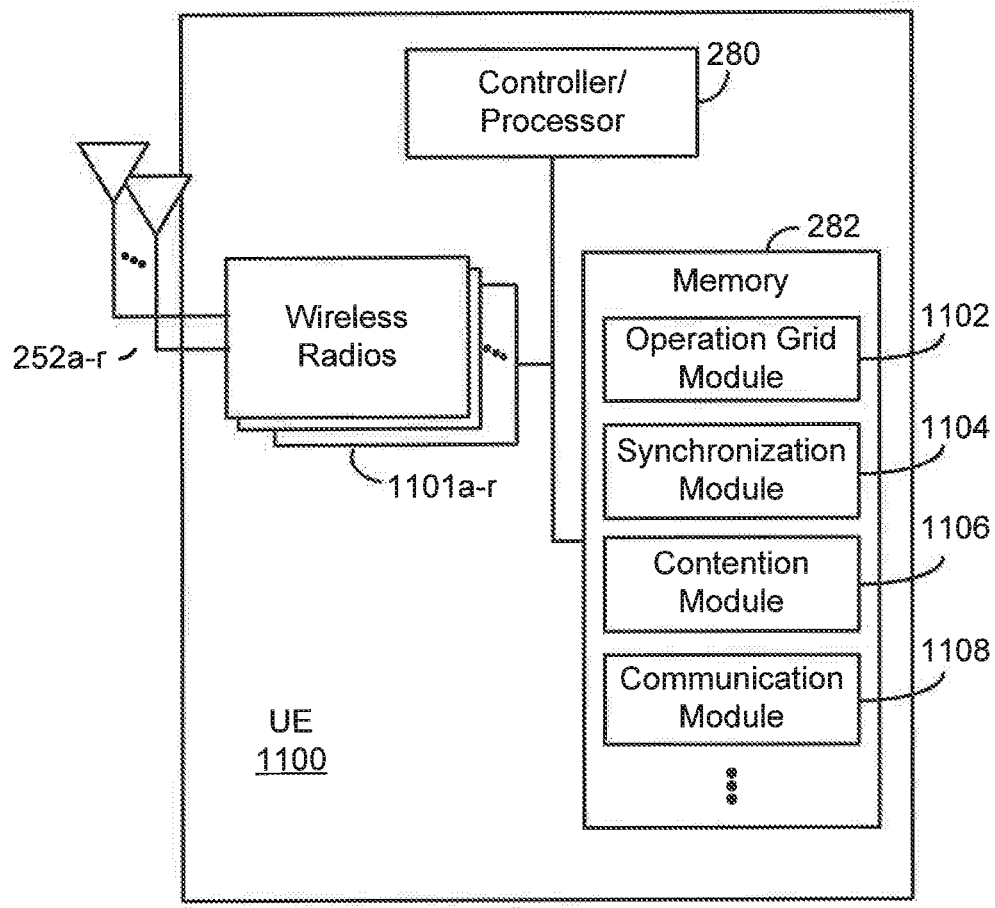
FIG. 11 is a block diagram illustrating components of a UE according to one or more aspects of the present disclosure.

Turning to FIG. 11, a UE 1100 may have the same or similar configuration as the configuration of UE 115, as illustrated in FIGS. 1 and 2, and/or UEs 415a and 415b of FIG. 4. UE 1100 may include controller/processor 280 to perform or direct the execution of various processes or program codes stored in memory 282. UE 1100 may further include wireless radios 1101a-r to process uplink or downlink signals received from antennas 252a-r. Memory 282 may store program codes for execution of operation grid module 1102, synchronization module 1104, contention module 1104, communication module 1108, or other modules/applications by controller/processor 280.

Operation grid module 1102, when enacted by controller/processor 280, may configure controller/processor 280 to perform procedures in accordance with receiving, using, and updating an operation grid, as described above with reference to FIGS. 4, 7A, and 7B. Synchronization module 1104, when enacted by controller/processor 280, may configure controller/processor 280 to perform procedures in accordance with transmission, detection, and use of synchronization signals, as described above with reference to FIGS. 4, 5A, 5B, 5C, 5D, 6A, 6B, 6C, 7A, and 7B. Contention module 1106, when enacted by controller/processor 280, may configure controller/processor 280 to perform procedures in accordance with generation, transmission, receipt, and use of contention messages, as described above with reference to FIGS. 4, 5A, 5B, 5C, 5D, 6A, 6B, 6C, 7A, and 7B. Communication module 1108, when enacted by controller/processor 280, may configure controller/processor 280 to perform procedures in accordance with deep preamble detection and use as described above with respect to FIGS. 4, 8A, and 8B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A, 6B, 6C, 7A, 7B, 8A, 8B, 9A, 9B, 9C, and 9D may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication apparatus, comprising:
   at least one computer processor; and
   a memory coupled to the at least one computer processor, wherein the at least one computer processor is configured to:
   receive, at a user equipment (UE), a reservation request (RRQ) transmitted by a next generation Node B (gNB); and
   transmit, by the UE in response to the RRQ, a reservation response signal (RRS),
   wherein the RRS carries a precoded sounding reference signal (SRS) modulated by an indication of interference estimated by UE.

2. The apparatus of claim 1, wherein the indication of interference corresponds to an inverse of a covariance matrix ($R_{nn}^{-1/2}$).

3. The apparatus of claim 2, wherein the gNB is a serving gNB that serves the UE, and wherein the $Rnn^{-1/2}$ communicates effective signal to interference noise ratio (SINR) post minimum mean square error (MMSE) for wireless communication between the UE and the serving gNB.

4. The apparatus of claim 2, wherein the gNB is a neighbor gNB that does not serve the UE, and wherein the $Rnn^{-1/2}$ communicates a rise in interference level, to wireless communication between the UE and a serving gNB, that is attributable to transmission by the neighbor gNB.

5. The apparatus of claim 4, wherein the $Rnn^{-1/2}$ includes an equivalence, per spatial dimension, of the rise in interference level, thereby enabling the neighbor gNB to determine transmission rank and transmission power per layer in a manner that avoids exceeding a predetermined interference level threshold.

6. The apparatus of claim 1, wherein the RRQ includes a precoded channel state information-reference signal (CSI-RS) that conveys rank used in a data portion of wireless communication between the UE to a serving gNB, and that facilitates calculation of a coarse interference covariance matrix (Rnn) by the UE.

7. The apparatus of claim 1, wherein the RRQ further includes a network allocation vector (NAV) and a control reference signal (RS) that enables decoding of the NAV.

8. The apparatus of claim 7, wherein the RRS is multiplexed, in a transmission opportunity (TxOp) identified by the NAV, with other RRSs transmitted by other UEs.

9. The apparatus of claim 1, wherein the RRS further includes a network allocation vector (NAV) and a control reference signal (RS) that enables decoding of the NAV.

10. The apparatus of claim 1, wherein the at least one computer processor is further configured to:
receive, by the UE before receiving the RRQ, a synchronization signal transmitted by the gNB;
use, by the UE, the synchronization signal to decode the RRQ; and
transmit, by the UE, another synchronization signal before transmitting the RRS.

11. The apparatus of claim 1, wherein the UE is synchronized with the gNB, and the at least one computer processor is further configured to:
determine, by the UE, whether the RRQ is received in a control region;
in response to the determination being that the RRQ is received in the control region, transmit the RRS, by the UE, in the control region; and
in response to the determination being that the RRQ is not received in the control region, transmit the RRS, by the UE, in a data region.

12. A wireless communication apparatus, comprising:
at least one computer processor; and
at least one memory coupled to the at least one computer processor, wherein the at least one computer processor is configured to:
transmit, by a next generation Node B (gNB) to a user equipment (UE), a reservation request (RRQ);
detect, by the gNB, a reservation response signal (RRS) transmitted by the UE in response to the RRQ, wherein the RRS includes a precoded sounding reference signal (SRS) modulated by an indication of interference estimated by UE; and
employ the indication of interference to select, for wireless communication between the UE and the gNB, at least one of:
a precoder;
a rank; or
a modulation and coding scheme (MCS).

13. The apparatus of claim 12, wherein the indication of interference corresponds to an inverse of a covariance matrix ($Rnn^{-1/2}$).

14. The apparatus of claim 12, wherein the RRQ includes a precoded channel state information-reference signal (CSI-RS) that conveys rank used in a data portion of wireless communication between the UE and the gNB, and that facilitates calculation of a coarse interference covariance matrix (Rnn) by the UE.

15. The apparatus of claim 12, wherein the gNB detects the RRS at −6 decibels (dB) signal to noise ratio (SNR).

16. The apparatus of claim 12, wherein the gNB employs the indication of interference to select the precoder for wireless communication between the UE and the gNB.

17. The apparatus of claim 12, wherein the gNB employs the indication of interference to select the rank for wireless communication between the UE and the gNB.

18. The apparatus of claim 12, wherein the gNB employs the indication of interference to select the MCS for wireless communication between the UE and the gNB.

19. The apparatus of claim 12, wherein the RRQ further includes a network allocation vector (NAV) and a control reference signal (RS) that enables decoding of the NAV.

20. The apparatus of claim 19, wherein the at least one computer processor is configured to detect, by the gNB, the RRS transmitted by the UE at least in part by detecting the RRS that is multiplexed, in a transmission opportunity (TxOp) identified by the NAV, with other RRSs transmitted by other UEs.

21. The apparatus of claim 12, wherein the at least one computer processor is configured to:
transmit, by the gNB, different RRQs to reserve one or more communication media for uplink and downlink traffic.

22. The apparatus of claim 12, wherein the at least one computer processor is configured to:
transmit, by the gNB before transmitting the RRQ, a synchronization signal;
receive, by the gNB before detecting the RRS, another synchronization signal transmitted by the UE; and
use, by the gNB, the other synchronization signal to decode the RRS.

23. The apparatus of claim 12, wherein the gNB is synchronized with another gNB, and the at least one computer processor is configured to:
observe, by the gNB, another RRQ and another RRS exchanged between the other eNB and another UE served by the other UE in a control region;
determine, by the gNB, that the other gNB does not have enough data to fill a transmission opportunity (TxOp) identified by the other RRQ and the other RRS; and
contend for transmission, by the gNB, in a remainder of the TxOp.

24. The apparatus of claim 23, wherein the gNB and the other gNB are of a same operator, and the at least one computer processor is configured to contend according to a soft reuse procedure that employs a mechanism involving exchange of RRQ and RRS.

25. The apparatus of claim 23, wherein the gNB and the other gNB are of different operators, and the at least one computer processor is configured to contend according to a prioritized random access procedure with one or more gNBs of other operators.

26. A wireless communication apparatus, comprising:
at least one computer processor; and
at least one memory coupled to the at least one computer processor, wherein the at least one computer processor is configured to:
- transmit, by a next generation Node B (gNB) to a user equipment (UE), a reservation request (RRQ);
- detect, by the gNB, a reservation response signal (RRS) transmitted by the UE in response to the RRQ, wherein the RRS includes a precoded sounding reference signal (SRS) modulated by an indication of interference estimated by the UE, wherein the indication of interference communicates a rise in interference level, to wireless communications between the UE and a serving gNB thereof, that is attributable to one or more wireless transmissions by the gNB; and
- transmit, by the gNB in response to the RRS, the wireless transmissions in a manner that avoids causing interference to the wireless communications that exceeds a predetermined interference level threshold.

27. The apparatus of claim 26, wherein the indication of interference corresponds to an inverse of a covariance matrix ($Rnn^{-1/2}$).

28. The apparatus of claim 27, wherein the $Rnn^{-1/2}$ includes an equivalence, per spatial dimension, of the rise in interference level, and the gNB determines a transmission rank and transmission power per layer in a manner that avoids exceeding the predetermined interference level threshold.

29. The apparatus of claim 26, wherein the RRQ includes a precoded channel state information-reference signal (CSI-RS) that conveys tones over which the UE should calculate a coarse interference covariance matrix (Rnn).

30. The apparatus of claim 26, wherein the gNB detects the RRS at −6 decibels (dB) signal to noise ratio (SNR).

31. The apparatus of claim 26, wherein the RRQ further includes a network allocation vector (NAV) and a control reference signal (RS) that enables decoding of the NAV.

32. The apparatus of claim 31, wherein the at least one computer processor is configured to detect, by the gNB, the RRS transmitted by the UE at least in part by detecting the RRS that is multiplexed, in a transmission opportunity (TxOp) identified by the NAV, with other RRSs transmitted by other UEs.

33. The apparatus of claim 26, wherein the at least one computer processor is further configured to:
- detect, by the gNB, a reservation request (RRQ) transmitted by a serving gNB of the UE, to reserve a communication medium for uplink transmission by the UE to the serving gNB; and
- transmit, by the gNB in response to the RRQ, the wireless transmissions in a manner that reduces interference to the uplink transmission by the UE.

34. The apparatus of claim 33, wherein the transmitting, by the gNB in response to the RRS, further reduces interference to the uplink transmission by the UE.

35. The apparatus of claim 26, wherein the at least one computer processor is further configured to:
- transmit, by the gNB before transmitting the RRQ, a synchronization signal;
- receive, by the gNB before detecting the RRS, another synchronization signal transmitted by the UE; and
- use, by the gNB, the other synchronization signal to decode the RRS.

36. The apparatus of claim 26, wherein the gNB is synchronized with another gNB, and the at least one computer processor is further configured to:
- observe, by the gNB in a control region, another RRQ and another RRS exchanged between the other eNB and another UE served by the other UE;
- determine, by the gNB, that the other gNB does not have enough data to fill a transmission opportunity (TxOp) identified by the other RRQ and the other RRS; and
- contend for transmission, by the gNB, in a remainder of the TxOp.

37. The apparatus of claim 36, wherein the gNB and the other gNB are of a same operator, and the at least one computer processor is configured to contend according to a soft reuse procedure that employs a mechanism involving exchange of RRQ and RRS.

38. The apparatus of claim 36, wherein the gNB and the other gNB are of different operators, and the at least one computer processor is configured to contend according to a prioritized random access procedure with one or more gNBs of other operators.

* * * * *